United States Patent
Lawlor et al.

(10) Patent No.: US 9,279,334 B2
(45) Date of Patent: Mar. 8, 2016

(54) GAS TURBINE ENGINE

(75) Inventors: Shawn P. Lawlor, Bellevue, WA (US); William Byron Roberts, II, Wellington, NV (US)

(73) Assignee: Dresser-Rand Company, Olean, NY (US)

( * ) Notice: Subject to any disclaimer, the term of this patent is extended or adjusted under 35 U.S.C. 154(b) by 802 days.

(21) Appl. No.: 13/542,674

(22) Filed: Jul. 6, 2012

(65) Prior Publication Data

US 2013/0149100 A1  Jun. 13, 2013

Related U.S. Application Data

(60) Provisional application No. 61/506,055, filed on Jul. 9, 2011, provisional application No. 61/506,064, filed on Jul. 9, 2011, provisional application No. 61/506,073, filed on Jul. 9, 2011.

(51) Int. Cl.
| | |
|---|---|
| *F01D 9/00* | (2006.01) |
| *F02C 9/16* | (2006.01) |
| *F02C 3/04* | (2006.01) |
| *F02C 7/00* | (2006.01) |
| *F01D 1/10* | (2006.01) |
| *F01D 1/02* | (2006.01) |
| *F01D 1/16* | (2006.01) |
| *F01D 9/04* | (2006.01) |
| *F02C 9/18* | (2006.01) |
| *F02C 3/00* | (2006.01) |
| *F02C 3/06* | (2006.01) |
| *F02C 3/14* | (2006.01) |
| *F04D 21/00* | (2006.01) |

(52) U.S. Cl.
CPC *F01D 9/00* (2013.01); *F01D 1/026* (2013.01); *F01D 1/10* (2013.01); *F01D 1/16* (2013.01); *F01D 9/047* (2013.01); *F02C 3/00* (2013.01); *F02C 3/04* (2013.01); *F02C 3/06* (2013.01); *F02C 3/14* (2013.01); *F02C 7/00* (2013.01); *F02C 9/16* (2013.01); *F02C 9/18* (2013.01); *F04D 21/00* (2013.01); *F05D 2220/3216* (2013.01); *F05D 2220/3218* (2013.01); *F05D 2220/3219* (2013.01); *F05D 2240/30* (2013.01); *F05D 2240/301* (2013.01); *F05D 2240/302* (2013.01); *Y02E 20/14* (2013.01)

(58) Field of Classification Search
CPC ............... F02C 9/16; F02C 3/00; F02C 3/04; F05D 2220/34; F05D 2220/3216; F05D 2220/3219; F05D 2240/302; F04D 29/44; F01D 29/44; F01D 9/00; F01D 9/02
See application file for complete search history.

(56) References Cited

U.S. PATENT DOCUMENTS

| | | | | |
|---|---|---|---|---|
| 2,805,818 | A * | 9/1957 | Ferri | F04D 21/00 415/148 |
| 7,434,400 | B2 * | 10/2008 | Lawlor | F01D 1/34 60/726 |
| 2011/0296841 | A1* | 12/2011 | Napier | F01D 9/02 60/751 |

*Primary Examiner* — Andrew Nguyen
(74) *Attorney, Agent, or Firm* — Edmonds & Nolte, PC

(57) ABSTRACT

A gas turbine engine with a compressor rotor having compressor impulse blades that delivers gas at supersonic conditions to a stator. The stator includes a one or more aerodynamic ducts that each have a converging portion and a diverging portion for deceleration of the selected gas to subsonic conditions and to deliver a high pressure oxidant containing gas to flameholders. The flameholders may be provided as trapped vortex combustors, for combustion of a fuel to produce hot pressurized combustion gases. The hot pressurized combustion gases are choked before passing out of an aerodynamic duct to a turbine. Work is recovered in a turbine by expanding the combustion gases through impulse blades. By balancing the axial loading on compressor impulse blades and turbine impulse blades, asymmetrical thrust is minimized or avoided.

56 Claims, 14 Drawing Sheets

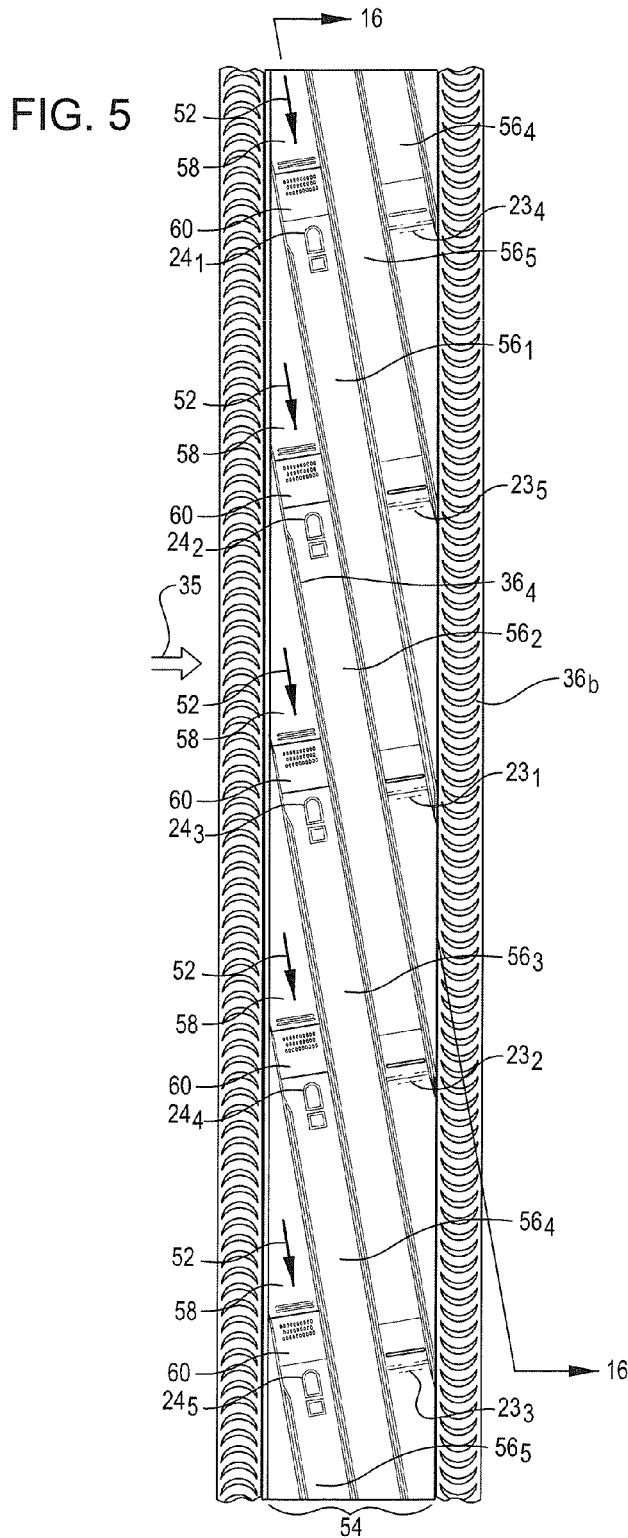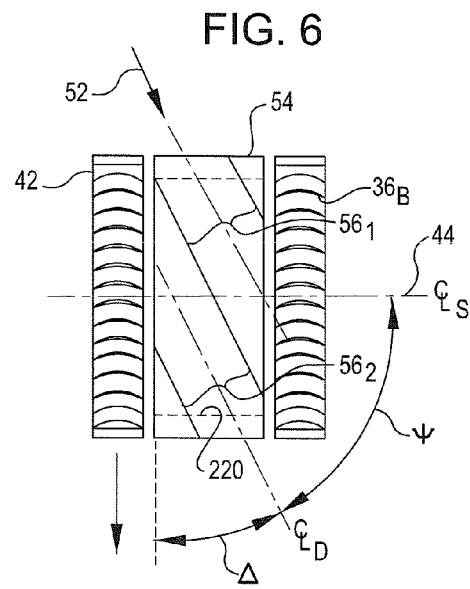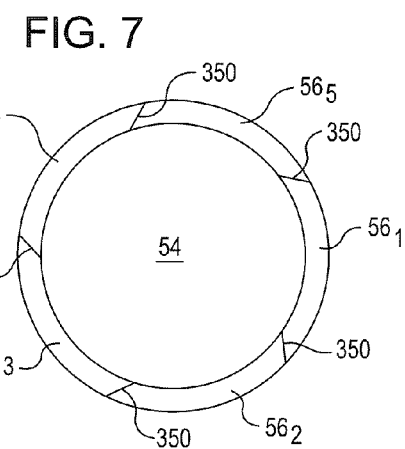

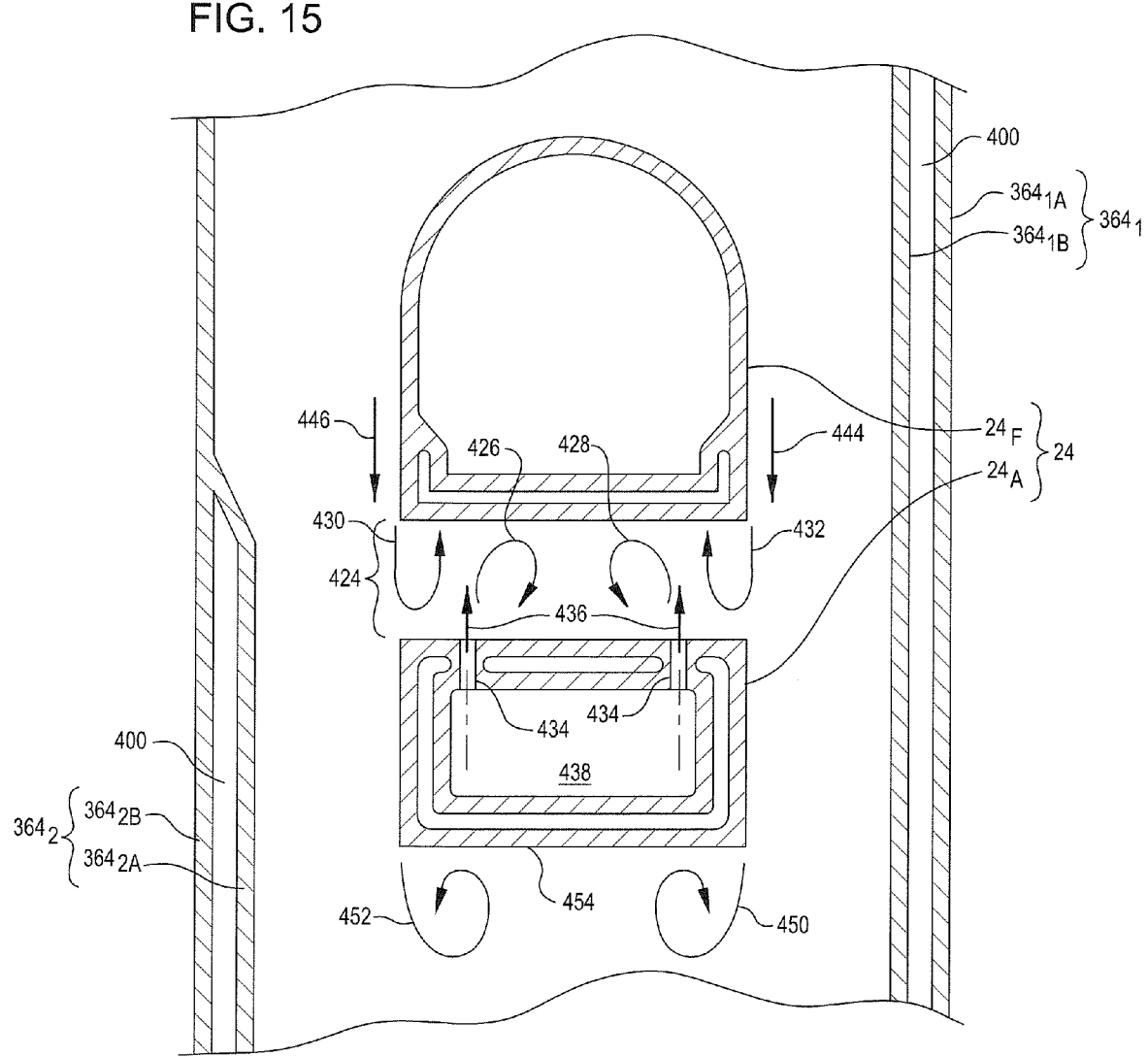

GAS TURBINE ENGINE

CROSS-REFERENCE TO RELATED APPLICATIONS

This application claims priority from prior pending U.S. Provisional patent applications, each of which was filed on Jul. 9, 2011, as U.S. Provisional Patent Application Ser. No. 61/506,055, for a SUPERSONIC COMPRESSOR, as U.S. Provisional Patent Application Ser. No. 61/506,064, for a GAS TURBINE ENGINE WITH SUPERSONIC COMPRESSOR, and as U.S. Provisional Patent Application Ser. No. 61/506,073, for a GAS TURBINE ENGINE, each of which are incorporated herein in their entirety by this reference.

STATEMENT OF GOVERNMENT INTEREST

This invention was made with United States Government support under Contract No. DE-FE0000493 awarded by the United States Department of Energy. The United States Government has certain rights in the invention.

COPYRIGHT RIGHTS IN THE DRAWING

A portion of the disclosure of this patent document contains material that is subject to copyright protection. The applicant has no objection to the facsimile reproduction by anyone of the patent document or the patent disclosure, as it appears in the Patent and Trademark Office patent file or records, but otherwise reserves all copyright rights whatsoever.

TECHNICAL FIELD

This description relates to gas turbine engines, and more particularly to gas turbine engines which provide supersonic shock compression of an inlet gas such as ambient air.

BACKGROUND

A continuing interest exists in industry for improved gas turbine engines. For many reasons, gas turbine engines continue to be useful in a wide variety of applications. Operational costs could be substantially improved in many applications by adoption of an improved gas turbine engine that would increase operating efficiency as compared to currently utilized gas turbine designs. Further, from the point of view of maintenance costs, it would be desirable to develop improved gas turbine engine designs that reduce the mass of rotating components, since such rotating components are comparatively costly when replacement or repair becomes necessary, as compared to non-rotating parts, which although subject to stress and strain from temperature and pressure, are not subject to additional loads due to rotary motion. Thus, it can be appreciated that it would be advantageous to provide a new, high-efficiency gas turbine design which minimizes moving parts. Generally, it would be advantageous to provide more horsepower with less weight. And more specifically, it would be advantageous to provide small gas turbines having a relatively high overall efficiency, particularly in the one-half to three megawatt range.

Components of gas turbine engines include a compressor, a combustor, a nozzle or choke, and a turbine. Although supersonic compressors have been contemplated for use in gas turbine engines, in so far as we are aware, there remain various technical problems in the field and with respect to which better solutions are required in order to improve operational capability and compression efficiency. In particular, although relatively low pressure ratio supersonic compressors have been proposed for gas turbine engines, there still remains a need for gas turbine engines that can be easily started, yet be operated at high compression ratios. Further, it would be advantageous to avoid configurations that present moving shocks, such as between moving blades, or between moving and fixed blades, or between moving blades and fixed walls, in order to more simply achieve stability for normal shock location in the compressor of a gas turbine engine. Further, new designs that might reduce or minimize mechanical issues such as axial thrust loading and the requirement for expensive bearings and related equipment, would be desirable.

Although a variety of gas turbine engines with supersonic compressors have been contemplated, the work of G. F. Hausmann as reflected in U.S. Pat. No. 2,947,139, issued Apr. 2, 1960, and entitled By-Pass Turbojet is instructive of such work generally, and thus is suggestive of technical problems that remain in the field and with respect to which better solutions are required in order to improve operational capability and compression efficiency. The Hausmann patent describes the use of counter-rotating impulse blade rotors (or a single rotor in another embodiment) with a downstream stator, combustor, and convergent/divergent exhaust nozzle. However, that device is directed at aircraft propulsion applications. Flow is maintained substantially axially, with attendant losses. And, like other prior supersonic compressor designs, the design does not address minimization of the total "wetted area"—including the leading edges subject to bow wave shock losses which result in loss of efficiency. And, although the Hausmann patent suggests "high pressure" ratios, the pressure ratios noted therein are quoted as being "6 or 7 with adiabatic efficiencies which approach multi-stage subsonic compressors."

In short, there remains a need to provide a design for a high pressure ratio—such as in excess of seven to one (7:1), or even twice that, or more—in a supersonic compressor that simultaneously resolves various practical problems seen in previous designs. Such problems include (a) providing for starting of a compressor designed for high pressure ratio operation so as to control a normal shock wave at an effective location in a supersonic diffuser designed for high pressure ratio and efficient compression, (b) avoiding excessive numbers of leading edge structures (such as may be encountered in prior art multi-bladed stators), and minimizing other losses encountered by a high velocity supersonic gas stream upon entering a diffuser, and (c) providing for effective boundary layer control, especially as related to retention of a normal shock at a desirable location, in order to achieve high compression ratios in an efficient manner. Further, improvements in overall power to weight ratio (that is, providing power in a small, compact package), and in overall cycle efficiency (thus improving fuel economy), would be a distinct advantage in many, if not most applications.

SUMMARY

A novel gas turbine engine has been developed that, in an embodiment, utilizes a supersonic compressor in which the total mass, foot print, (and the number) of rotating parts has been minimized. In an embodiment, the compressor of the gas turbine utilizes impulse blades on a compressor rotor to develop gas velocity in an incoming gas stream, to accelerate the incoming gas stream tangentially and axially, and to deliver gas flow at supersonic flow conditions to a stator. In an embodiment, the impulse blades may include a peripheral shroud. The stator includes a plurality of aerodynamic ducts that utilize supersonic diffusers having a converging inlet cross-sectional area in a flow-wise direction for decelerating incoming gas. A subsonic diffuser having a diverging outlet cross-section area in a flow-wise direction is utilized to diffuse the incoming gas and recover pressure energy. In an embodiment, a design utilizes aerodynamic ducts which minimize the total number of leading edges, and which minimize the length of leading edges exposed to an incoming flow of gas at supersonic conditions. In an embodiment, the aerodynamic ducts may be wrapped about a surface of revolution that extends along a longitudinal axis, for example, a selected cylindrical shape or selected partial conical shape. In various embodiments, aerodynamic ducts may be provided in helical, helicoidal, or spiral configurations. In an embodiment, aerodynamic ducts may be provided helically arranged about a longitudinal axis. In an embodiment, aerodynamic ducts may be provided in a shape having a relatively constant helical angle. In an embodiment, aerodynamic ducts may be provided along a longitudinal centerline in the configuration of a general helix, such that the ratio of curvature to torsion is generally constant. Alternately, aerodynamic ducts may be provided in a conical helix configuration, in the form of a slight spiral as if located over an underlying conic surface. In various embodiments, aerodynamic ducts may be either right handed or left handed. In an embodiment, the entrance of the aerodynamic ducts may be oriented substantially in concert with the direction of high-velocity supersonic gas leaving a compressor rotor, directed toward the stator. At least one oblique shock, and in an embodiment a series of oblique shocks, and a normal shock, may be utilized within aerodynamic ducts to efficiently transform the high-velocity supersonic incoming gas flow to a high-pressure subsonic gas flow. Subsequent to a subsonic diffuser, the high pressure gas is directed to a combustor, which may be provided with a flameholder in the form of a trapped vortex combustor. Hot, high-velocity combustion gases are choked through an outlet nozzle and then expanded through one or more turbine stages for recovery of shaft power. In an embodiment, the one or more turbine stages may be provided by axial gas turbines. In an embodiment, turbine blades may be provided in the form of impulse blades. In an embodiment, the turbine blades may also be provided with a peripheral shroud.

For starting supersonic shocks in a compressor for a gas turbine engine, aerodynamic ducts may include bypass gas passageway outlets that remove a portion of the incoming gas flow to an extent that facilitates the establishment of supersonic shocks within the aerodynamic duct, consistent with a design point for a selected compression ratio, inlet Mach number, and mass flow of a selected gas. In an embodiment, the bypass gas outlets may be utilized to recycle of a portion of incoming gas. In an embodiment, particularly for the usual gas turbine application involving compression of ambient air, the bypass gas may be simply discharged to the atmosphere. Adjustable internal bypass passageways may be provided, for example using doors that are actuated to an open position during startup, but which remain closed during normal operation, to allow a portion of incoming gas to pass downstream of the throat of the aerodynamic duct while most, if not all of the flow, remains within in an aerodynamic duct. In an embodiment, both bypass gas outlets for removal of a portion of incoming gas, and other contraction ratio adjusters, including openable doors as just described, may be utilized.

For minimization of adverse aerodynamic effects, and for improving efficiency of gas flow through an aerodynamic duct, one or more boundary layer control structures may be utilized. Such boundary layer control structures may be selected from one or more types of boundary layer control techniques, including removal of a portion of gas flow via boundary layer extraction or bleed, or by energizing a boundary layer by boundary layer gas injection, or by energizing a boundary layer by mixing, such as by use of vortex generators.

In an embodiment, the compressor of a gas turbine engine as described herein may have a plurality of gas paths, that is, multiple aerodynamic ducts, for generating supersonic shock waves and for allowing subsonic diffusion downstream of a throat portion. Since, in an embodiment, supersonic shocks may be located within stationary structures, such as along a stationary portion of an aerodynamic duct, the control of shock location is greatly simplified, as compared to various prior art supersonic compressor designs where shocks are located between structures within rotors, or between adjacent rotors, or between rotors and adjacent stationary structures such as circumferential walls.

Further, the location of shocks within stationary aerodynamic ducts avoids parasitic losses that are present in prior art designs due to drag resulting from the rotational movement of various rotor components. More fundamentally, an embodiment of the gas turbine compressor design disclosed herein develops high compression ratios with very few aerodynamic leading edge structures, particularly stationary structures, protruding into the supersonic flow path. In part, such improvement is achieved by minimizing the number of aerodynamic ducts. In an embodiment, only a single leading edge is provided per aerodynamic duct, and thus the number of leading edge surfaces interposed into a supersonic flow stream is minimized. Consequently, the compressor design(s) disclosed herein have the potential to provide highly-efficient gas turbines, especially when such compressors operate at high compression ratios in a single compression stage. For example, and without limitation, the gas turbine compressor designs disclosed herein may utilize compressors operating at compression ratios in a single stage in excess of about seven to one (7:1), or about ten to one (10:1) or more, or about fifteen to one (15:1) or more, or about twenty to one (20:1) or more. Generally, the higher the pressure ratio, the higher thermal efficiency achievable in a gas turbine engine utilizing designs taught herein.

Finally, many variations in gas in-flow configurations, particularly in detailed rotor blade geometry and in detailed aerodynamic duct geometry, may be made by those skilled in the art and to whom this specification is directed, without departing from the teachings hereof.

BRIEF DESCRIPTION OF THE DRAWINGS

The present invention(s) will be described by way of exemplary embodiments, using for illustration the accompanying drawing figures in which like reference numerals denote like elements, and in which:

FIG. 3 also shows an embodiment for an aerodynamic duct in which the longitudinal centerline of the aerodynamic duct is in close alignment with the direction of gas flow leaving the compressor rotor blades.

FIG. 5 provides a circumferential view of an exemplary gas flow path into an impulse bladed rotor and thence through a stator having leading edges with a plurality of aerodynamic ducts each having a converging portion provided with decreasing cross-sectional area and a diverging portion having increased cross-sectional area, and showing bypass bleed passageways for starting, and boundary layer bleed ports to assist in boundary layer control, for shock stability, and for efficiency.

FIG. 6 is a diagrammatic side view for an embodiment for a compressor for a gas turbine engine, depicting the use of an impulse bladed rotor (blades shown with shroud) with an aerodynamic duct including a plurality of aerodynamic ducts located around a surface of rotation, in an embodiment helicoidally, and wherein the surface of rotation as indicated by a broken line is generally cylindrical in shape, and with impulse-bladed turbine disc (blades shown with shroud).

FIG. 7 is a vertical cross-sectional view taken at line 7-7 of FIG. 3, showing an embodiment for an entrance to a stator, here showing five (5) aerodynamic ducts, and further showing short height of leading edges of the aerodynamic ducts.

Figure 1:
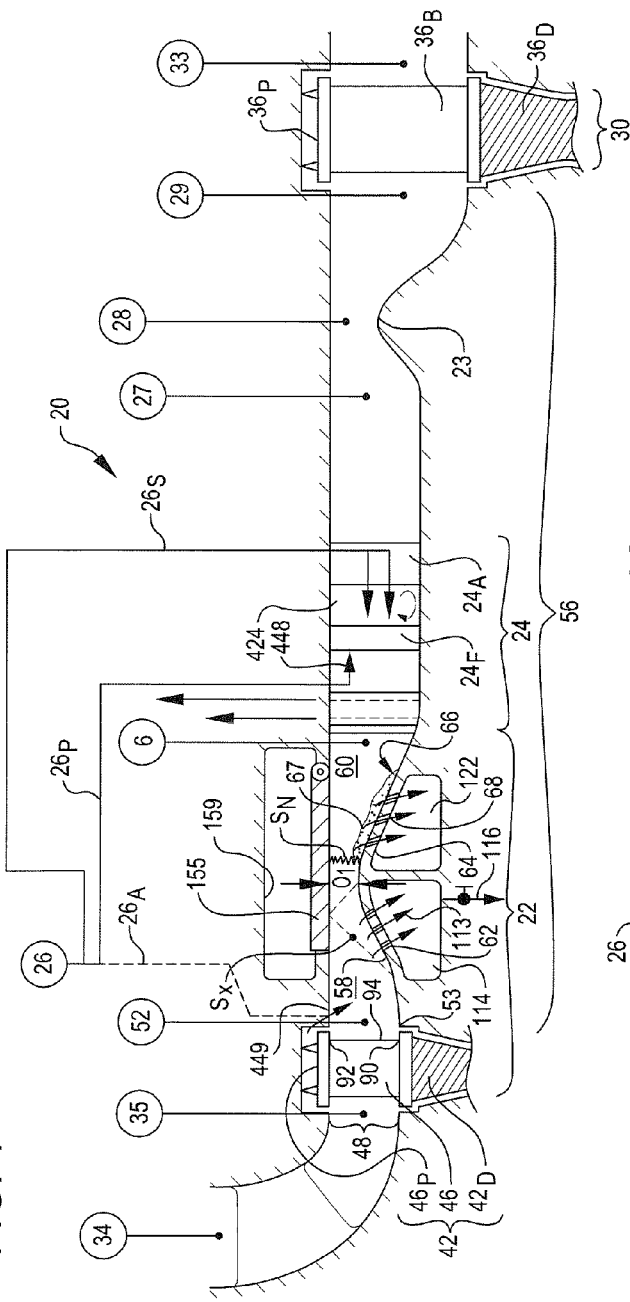
FIG. 1 is a cross-sectional schematic view, flow-wise, of an exemplary compact gas turbine engine design utilizing a supersonic compressor, including compressor impulse blades and a stator including aerodynamic ducts, and combustor and flameholder provided in the aerodynamic ducts, as well as an outlet nozzle/choke, and a turbine.

The foregoing figures, being merely exemplary, contain various elements that may be present or omitted from actual gas turbine engine designs, utilizing supersonic compressors according to the principles taught herein. Other designs may use slightly different aerodynamic structures, mechanical arrangements, or process flow configurations, and yet employ the principles described herein or depicted in the drawing figures provided. An attempt has been made to draw the figures in a way that illustrates at least those elements that are significant for an understanding of an exemplary gas turbine engine utilizing a supersonic compressor. Such details should be useful for providing an efficient gas turbine engine design for use in industrial systems. Various disclosed features may be utilized singularly or collectively in accord with the teachings hereof, as may be useful in different embodiments or as necessary for a variety of applications, depending upon the conditions of service, and remain within the scope and coverage of the teachings herein as defined by the appended claims.

DETAILED DESCRIPTION

The following detailed description, and the accompanying figures of the drawing to which it refers, are provided describing and illustrating some examples and specific embodiments of various aspects of the invention(s) set forth herein, and are not for the purpose of exhaustively describing all possible embodiments and examples of various aspects of the invention(s) described and claimed below. Thus, this detailed description does not and should not be construed in any way to limit the scope of the invention(s) claimed in this or in any related application or resultant patent.

To facilitate the understanding of the subject matter disclosed herein, a number of terms, abbreviations or other shorthand nomenclature are used as set forth herein below. Such definitions are intended only to complement the usage common to those of skill in the art. Any term, abbreviation, or shorthand nomenclature not otherwise defined shall be understood to have the ordinary meaning as used by those skilled artisans contemporaneous with the first filing of this document.

In this disclosure, the term "aerodynamic" should be understood to include not only the handling of air, but also the handling of other gases within the compression and related equipment otherwise described. Thus, more broadly, the term "aerodynamic" should be considered herein to include gas dynamic principles for gases other than air. For example, although ambient air may be compressed using the compressor of the apparatus described, certain gas turbine engine applications exist for other gaseous mixtures, some including certain gaseous fuel components, and/or containing other oxidants, and thus as applicable the term "aerodynamic duct" shall also include the compression of gases or gas mixtures other than ambient air, in what may be considered a gas dynamic duct.

The term "choke" or "choked flow" may be used to refer to a structure that provides a compressible effect in the flow of a gas, and as used herein, with respect to hot combustion gases. With initially subsonic upstream conditions, the conservation of mass principle requires fluid velocity to increase when the fluid flows through a smaller cross-sectional area of a restriction, or "choke". At the same time, a Venturi effect causes the static pressure, and therefore the density, to decrease downstream past the restriction, or "choke". For homogeneous gases, the physical point at which the choking occurs for adiabatic conditions is when the exit plane velocity is at sonic conditions or at a Mach number of 1. At choked flow, the mass flow rate can be increased by increasing the upstream pressure, or by decreasing the upstream temperature.

The term "contraction ratio" may be used to describe the ratio of the cross-sectional area at a throat of an aerodynamic duct to the cross-sectional area at the inlet of the aerodynamic duct. Boundary layer growth inside a converging inlet portion of decreasing cross-sectional area of a supersonic diffuser may effectively decrease area available for gas flow, and thus decrease the effective contraction ratio, particularly at startup of an aerodynamic duct. Removal of such a boundary layer may be employed to effectively increase the throat area, and thus permit starting of an aerodynamic duct at a contraction ratio smaller than a theoretical value for design conditions of a particular aerodynamic duct. Thus an effective contraction ratio may be adjusted by removal of a portion of an inlet gas.

The term "diffuser" may be used to describe an apparatus designed to reduce the velocity and increase the pressure of a gas entering at supersonic velocity. A diffuser may employ one or more aerodynamic ducts, which, when multiple aerodynamic ducts are used, divide the incoming gas into smaller flows for processing. Such aerodynamic ducts in a diffuser may include (a) a supersonic diffuser portion, which may be in the form of a converging inlet portion having an inlet cross-sectional area, and thence constructed generally of decreasing cross-sectional area flow-wise and which receives gas at supersonic velocity and creates oblique shocks, (b) a throat portion, at or in which in a minimal throat cross-sectional area is provided, and (c) a subsonic diffuser portion, which may be in the form of a diverging outlet portion of increasing cross-section toward a final subsonic diffuser cross-sectional area and which allows kinetic energy from gas velocity to be converted into static pressure of the gas.

The term "impulse blade(s)" may be used to describe blades used to accelerate the flow of gas having a characteristic geometry wherein kinetic energy is imparted to the gas passing therethrough, and at a theoretical limit, no pressure increase is imparted to the gas passing therethrough. Thus, in impulse blades as described herein, the work done on a gas flow by impulse blades results predominantly in an increase in velocity, rather than predominantly in an increase in pressure. The velocity increase of a gas flow through impulse blades is achieved by change of direction of the gas flow.

The term "inlet" may be used herein to define an opening designed for receiving fluid flow, and more specifically, the flow of gas. For example, in an aerodynamic duct for a diffuser of in a compressor section of a gas turbine, the aerodynamic duct has an inlet having an inlet cross-sectional area that is shaped to capture and ingest gas to be compressed. Inlets may have a large variety of shapes, and a few exemplary shapes are provided herein.

The term "startup" may be used to define the process of initiating gas flow in aerodynamic ducts, and achieving stable supersonic flow of gas through a converging portion, and into at least some of a diverging portion of generally increasing cross-sectional area extending downstream from a throat of an aerodynamic duct. More specifically, startup is the achievement of a condition wherein shock waves defining the boundary between supersonic and subsonic conditions of gas flow are stabilized at a desired location in an aerodynamic duct, given the mass flow, inlet Mach number, and pressure ratio for a selected gas composition being compressed. In general, various structures and/or systems as described herein may be used for startup, in order to conduct the process of initiating operation and establishing a stable shock system in aerodynamic ducts. In various embodiments, a contraction ratio adjuster of a selected design and configuration may be provided, allowing for a shock to be swallowed through a throat in an aerodynamic duct, to thereby start the aerodynamic duct. In other embodiments, contraction ratio may be adjusted using a startup system having bypass outlet passageways that allow external discharge of a portion of the inlet gas flow thereto, in order to provide for startup, again by allowing a shock to be swallowed through a throat in an aerodynamic duct. In other embodiments, aerodynamic ducts may be configured to allow a portion of the gas flow thereto to internally bypass the throat and return to the aerodynamic duct downstream of the throat. Such gas flow may be contained by a pressurizable plenum and reintroduced into a diverging portion of an aerodynamic duct. The performance of the aerodynamic ducts when in a startup configuration may be provided in a manner that would be roughly the same as might be found in an aerodynamic duct without adjustable gas flow and having the approximately same effective contraction ratio, that is subject to the same the degree of blockage of flow through the aerodynamic duct, as in a fixed geometry aerodynamic duct. However, once startup is achieved and stable supersonic flow is established, bypass valves, gates, doors, or other structures and systems employed to provide for removal or bypass of some gas with respect to the throat, may be closed or returned to an operating position or operating condition. Thereafter, in an operational configuration, a gas turbine engine as described herein provides aerodynamic ducts wherein a high overall pressure ratio recovery is achieved even when a single stage of compression is employed.

The term "un-start condition" may be used herein to describe a flow condition under which gas to be compressed flows through an inlet to an aerodynamic duct much less effectively than under design conditions, and wherein some, or even most of entering gas may be rejected from the inlet, instead of being properly ingested for effective operation of the compressor. In various embodiments, during an un-start condition, supersonic flow conditions with stable shocks would not be properly established at their design range locations within an aerodynamic duct.

Figure 2:
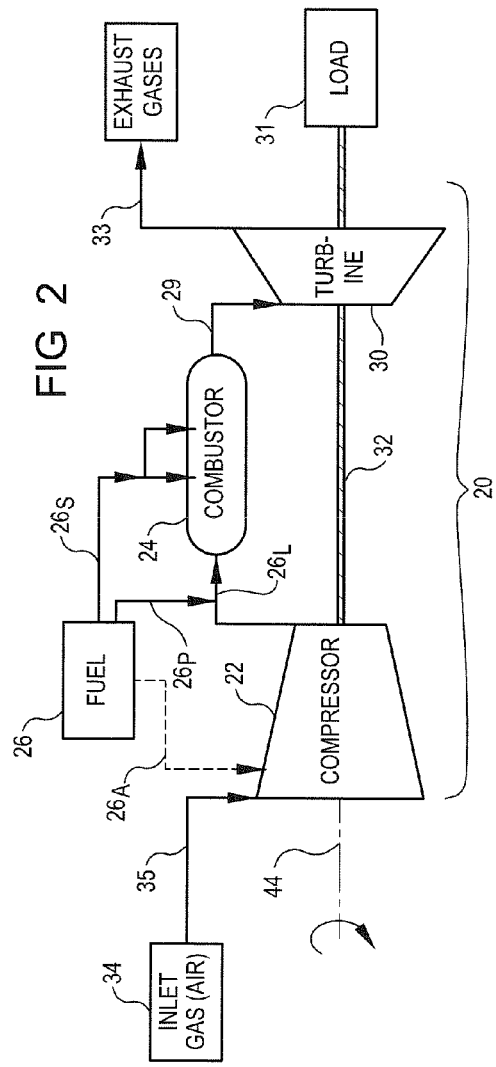
FIG. 2 is a schematic view of an overall design concept for a gas turbine engine, illustrating a compressor, a primary and secondary fuel supply, a combustor, a turbine, and output shaft work provided to a load.
Figure 19:
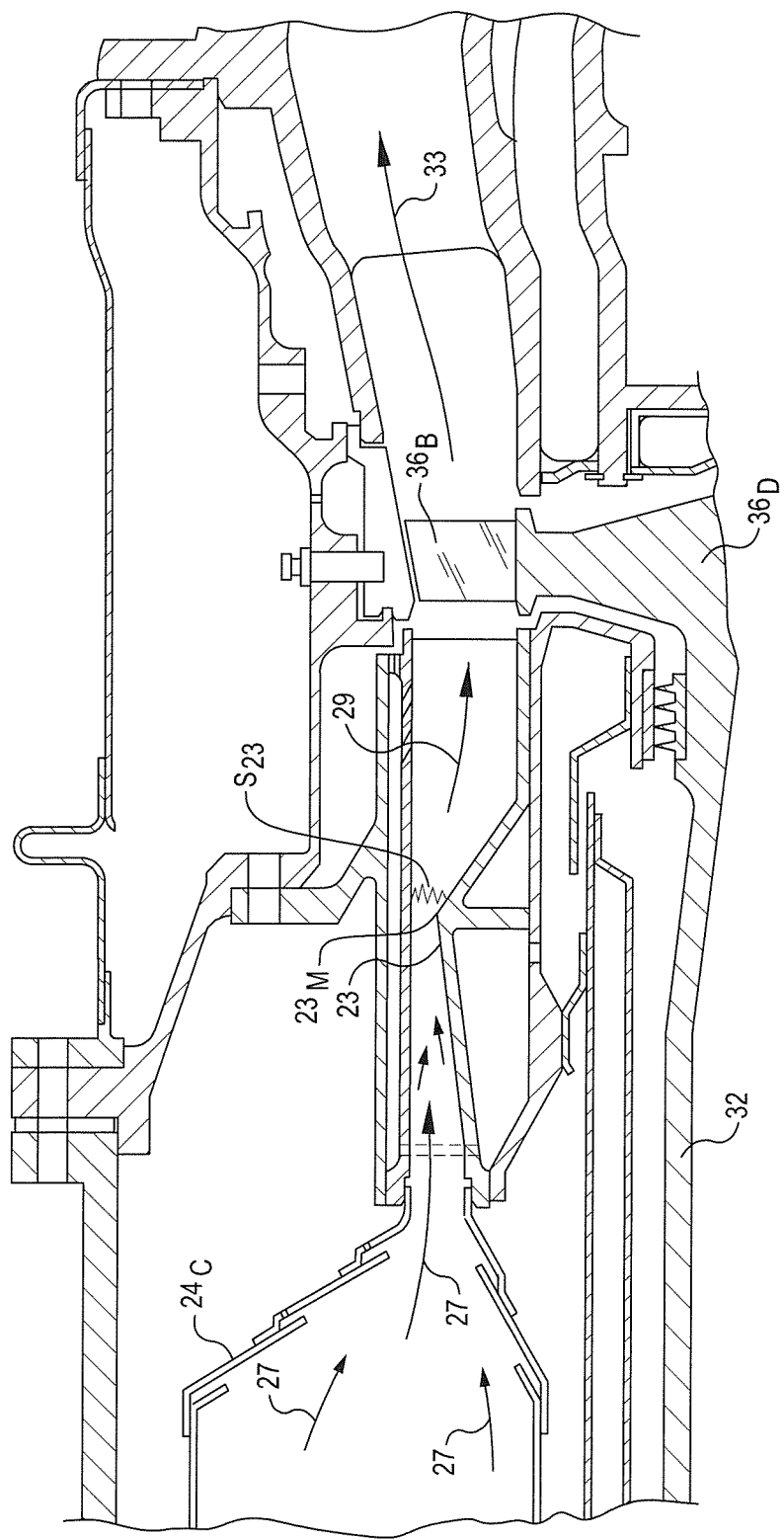
FIG. 19 is a partial cross-sectional view of an embodiment for a gas turbine engine generally configured according to the design first set forth in FIG. 1, now showing in more detail a choke configured as a nozzle downstream of the outlet of a pressurized combustion chamber, which nozzle is positioned to impart a high velocity combustion exit gas stream against turbine blades, but also showing the use of can type combustor configuration.
Figure 20:
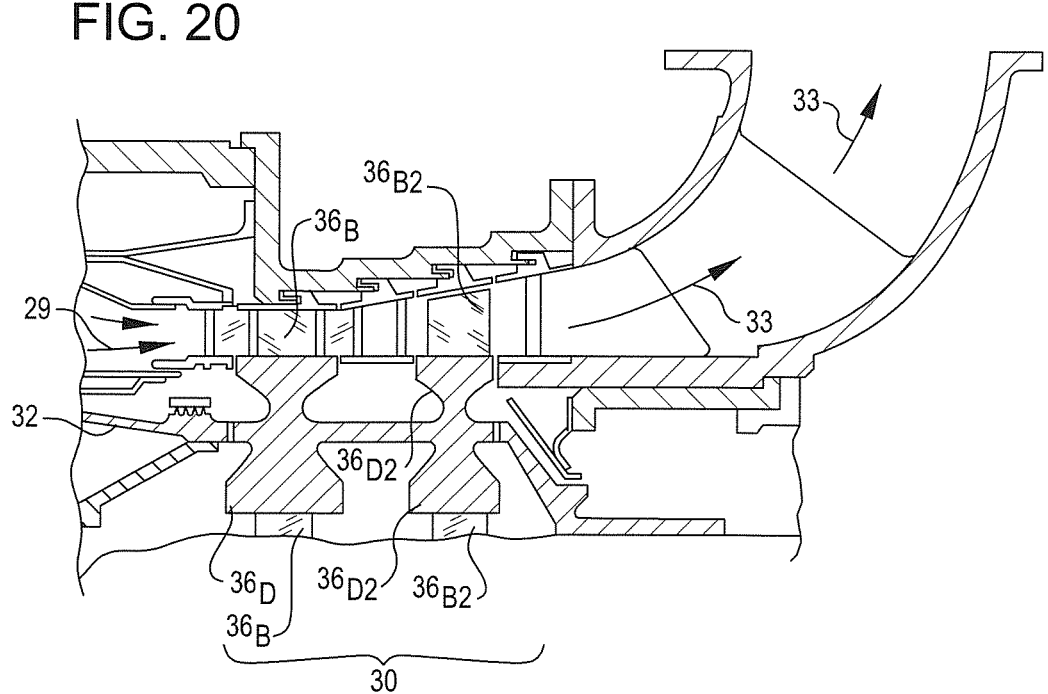
FIG. 20 is a partial cross-sectional view of an embodiment for a gas turbine engine generally configured according to the design first set forth in FIG. 1, now additionally showing the use of multiple turbines downstream of the nozzle/choke, where the turbine blades are positioned to receive the high velocity combustion exit gas stream downstream of the nozzle/choke.

Attention is directed to FIGS. 1 and 2. In FIG. 1, a schematic cross-sectional view, taken flow-wise along the gas flow path in a compact gas turbine engine 20 is shown. FIG. 2 provides reference for the basic components of a compact gas turbine engine 20. A compact gas turbine engine 20 may utilize a supersonic compressor 22, a combustor such as a trapped vortex combustor 24, to burn fuel 26 and produce hot combustion gases 27, which traverse downstream to a nozzle or choke 23, as shown in FIG. 1. As seen in FIG. 19, in an embodiment, the nozzle/choke 23 may be configured as a supersonic nozzle, in which case a supersonic shock $S_{23}$ may be located downstream of the minimum area portion of nozzle/choke $23_M$. Downstream of the choke 23, hot, pressurized, and high-velocity combustion gases 29 are then directed to, for passage therethrough, blades $36_B$ (and blades $36_{B2}$, if present, as shown in FIG. 20) of a gas turbine 30, to produce shaft power, which may be utilized by suitable load 31 (noted in FIG. 2). Exhaust gases 33 are discharged, or used in cogeneration process schemes (not shown) as appropriate for a particular application. A portion of the power produced may be transmitted to the compressor 22, or more specifically compressor rotor 42, via a shaft 32, to process an inlet gas 35 such as ambient air 34. The gas turbine 30 may include one or more gas turbines. In an embodiment gas turbine 30 may include a single gas turbine rotor disc $36_D$ with turbine blades $36_B$, for expansion of hot, pressurized, and high-velocity combustion gases 29. In an embodiment, turbine blades $36_B$, may be provided as impulse blades. In an embodiment, turbine blades $36_B$ may be provided with a peripheral shroud $36_P$ (as seen in FIG. 3).

Returning to the illustration of FIG. 1, the compressor rotor 42, includes a plurality of blades 46 extending into a gas flow passage 48. Compressor blades 46 may be sized and shaped to act on a selected inlet gas 35, such as ambient air 34 or other selected oxidant-containing gas, to provide a supersonic gas flow 52 at an inlet 53 to an aerodynamic duct 56. In an embodiment, the compressor blades 46 may be provided as impulse blades. In an embodiment, the compressor blades 46 may be provided with a peripheral shroud $46_P$. The gas 52 flowing at supersonic conditions encounters the converging inlet portion 58 and diverging outlet portion 60. In the converging inlet portion 58, shock structures occur in the gas flow 52 and at least one oblique shock $S_X$ occurs, although a number of shocks in a series from $S_1$ to $S_X$ may be utilized. After startup, a number of shock structures in a series from $S_1$ to $S_X$ may appear in an operating configuration for the gas turbine engine 20, and a normal shock $S_N$ may be provided at an operating position located at or downstream of the throat $O_1$.

Since the compressor blades 46 primarily impart kinetic energy to the inlet gas 35, and since the turbine blades $36_B$ primarily extract kinetic energy from the hot, high-velocity combustion gases 29, when the compressor rotor blades 46 and the turbine blades $36_B$ are coupled together (through attendant compressor rotor $42_D$ and turbine $36_D$ rotor, respectively, and shaft 32 or the like as noted in FIG. 2), loading on the plurality of compressor rotor blades 46 and on the plurality of turbine blades $36_B$ may be substantially balanced, to minimize asymmetrical axial thrust loading, such as along shaft 32. This feature may enable the use of lower-cost bearings, since high thrust loads may be avoided. As shown in FIG. 2, when shaft 32, driven by turbine 30, drives the compressor 22 via rotor 42, gas 52 leaves the compressor rotor blades 46 traveling in substantially the same direction as gas 29 (see also FIG. 1) which is entering turbine blades $36_B$. Accordingly, the turbine 30 and compressor rotor 42 may be configured to turn in the same direction. Such direction may be in either clockwise rotation or in counterclockwise rotation, as suitable for a particular design, when viewed along path of gas 35 entering the compressor blades 46, as noted in FIG. 1.

Figure 3:
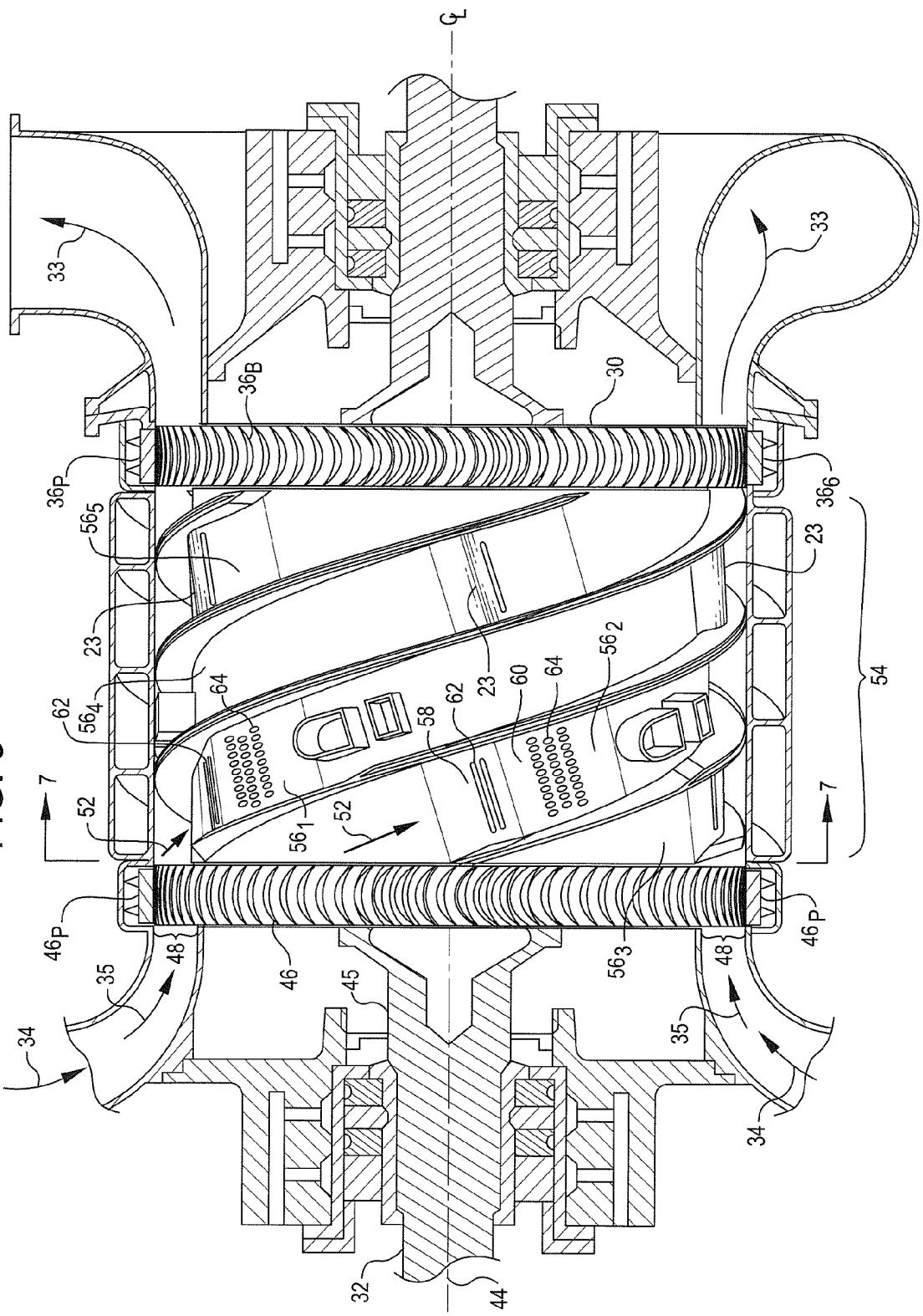
FIG. 3 is a partially cut-away vertical cross-section view, showing, in partial cross-section, an inlet passageway feeding an inlet gas supply to impulse blades on a compressor rotor (shown from the side to reveal exposed blades). The impulse blades deliver gas at supersonic conditions to a stator having a plurality of aerodynamic ducts. The aerodynamic ducts include converging inlet portions and diverging outlet portions, inlet bypass gas passageways for use in starting, and boundary layer bleed ports for boundary layer control, a trapped vortex combustor, an outlet nozzle, and turbine.

Turning now to FIG. 3, a stator 54 is illustrated, in location between the upstream compressor blades 46 and the downstream turbine blades $36_B$. In an embodiment, stator 54 may be disposed around a longitudinal axis 44 (shown with centerline $C_L$ in FIG. 3) and positioned to receive the supersonic gas flow 52 in aerodynamic ducts 56. In an embodiment, the stator 54 may be provided with a plurality of aerodynamic ducts 56. In the various drawing figures, the one or more aerodynamic ducts 56 may be individually further identified with a subscript as a first aerodynamic duct $56_1$, a second aerodynamic duct $56_2$, a third aerodynamic duct $56_3$, a fourth aerodynamic duct $56_4$, and a fifth aerodynamic duct $56_5$, and the like for each individual aerodynamic ducts 56 that may be utilized in a specific stator 54 design. Aerodynamic ducts 56 each include a converging portion 58 forming a supersonic diffuser and a diverging portion 60 forming a subsonic diffuser, as better seen in FIG. 1. FIG. 5 provides a circumferential view, sectioned through the middle of the aerodynamic ducts 56, to provide visibility of the aforementioned converging portions 58 each forming a supersonic diffuser and diverging portions 60 each forming a subsonic diffuser in each of the individual aerodynamic ducts. Also shown is the location of combustors 24, and the nozzle/choke 23, just upstream of the turbine blades $36_B$. For each of combustors 24 and nozzle/choke 23, subscripts are used to denote association with a particular aerodynamic duct 56, in the same manner as subscripts are explained just above with respect to usage with aerodynamic ducts 56 themselves, without need for further explanation.

Figure 8:
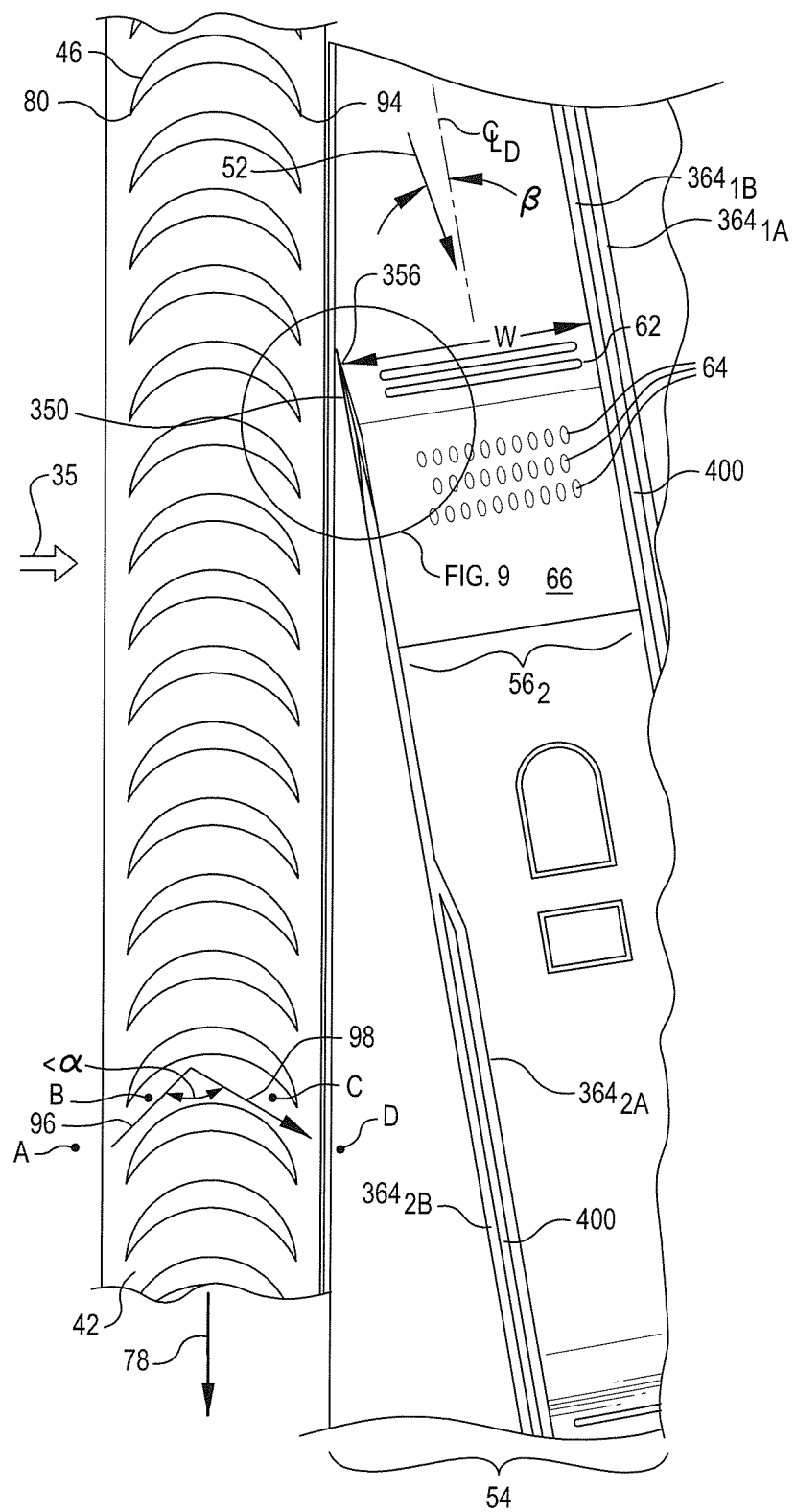
FIG. 8 is an enlargement of a portion of the circumferential view provided in FIG. 5, now showing a leading edge of an aerodynamic duct in a stator, and also showing a converging portion provided via a compression ramp and diverging portion illustrated by an expansion ramp, and showing starting bypass gas outlets and boundary layer bleed ports.

In an embodiment, as seen for example in FIG. 1, 3 or 8, a stator 54 may include therein one or more structures that enable startup, and one or more structures that provide for control of boundary layer losses, as more fully addressed below. In an embodiment, bypass gas passageways 62, as shown in FIG. 8, may be provided for removal of a portion of incoming gas 52 during startup conditions, so as to adjust the effective contraction ratio of the associated aerodynamic duct 56, here illustrated as duct $56_2$. In such manner, or using other structures described or suggested herein, aerodynamic ducts 56 may be designed for operation at high compression ratios, yet be adapted for startup of a stable supersonic shock system within the aerodynamic duct 56 that ultimately enables high compression ratio operation.

In an embodiment, aerodynamic ducts 56 may include one or more boundary layer control structures, such as bleed ports 64 as seen in FIG. 8 for removal of gas from aerodynamic ducts 56 as may be required for control of boundary layer 67 (exaggerated for illustration, see FIG. 1 or 12) at surface 66 of the aerodynamic duct 56, sending gas 68 to sub-chamber 122 therebelow.

Returning to FIG. 3, the gas turbine engine 20 may utilize a compressor 22 (see FIG. 1) having a rotor 42 (see FIG. 1) having an axis of rotation 44, and, for example a driving shaft 45, and a plurality of blades 46 extending into a gas flow passage 48. Blades 46 may be sized and shaped to act on a selected incoming gas 35 to provide a supersonic gas flow 52. A number N of aerodynamic ducts 56 and a number B of blades 46 may be provided, with the number B of blades 46 and the number N of aerodynamic ducts 56 being unequal, in order to avoid adverse harmonic effects. Aerodynamic losses are reduced by minimizing the number N of aerodynamic ducts 56, and more specifically, by reducing the number of components exposed to the supersonic incoming gas stream 52. Thus, in an embodiment, the number of blades 46 may considerably exceed the number of aerodynamic ducts 56, thereby reducing components exposed to supersonic flow. However any ratio between the number B of blades 46 and the number N of aerodynamic ducts 56 should be selected to avoid adverse harmonic effects.

As seen in FIG. 1, the aerodynamic ducts 56 each include a converging portion 58 and a diverging portion 60. As illustrated in FIG. 8, in an embodiment, rotor 42 may be configured to turn incoming gas 35 to provide a supersonic relative velocity gas flow 52 at a selected gas rotor exit angle beta ($\beta$) relative to the centerline $C_{LD}$ of the one or more downstream aerodynamic ducts 56. In an embodiment, the angle beta ($\beta$) may be zero degrees (0°) and thus a unique incidence angle is provided between the direction of the gas flow 52 and the centerline $C_{LD}$ of the one or more downstream aerodynamic ducts 56, such as $56_2$ as shown. Further, a rotor 42 and a stator 54 together provide a stage of compression. In cases where further compression is required, multiple stages of compression may be utilized to provide gas at a desired final pressure, before combustion. In an embodiment, but without limitation, the angle beta ($\beta$) may be provided at zero degrees (0°), wherein the direction of gas flow 52 is aligned with the centerline $C_{LD}$ of aerodynamic ducts 56, and thus a unique incidence angle is provided between the direction of the gas flow 52 and the centerline $C_{LD}$ of the one or more downstream aerodynamic ducts 56. In other words, in an embodiment, a unique incidence angle is provided since the direction of gas flow 52 matches the centerline $C_{LD}$ of an aerodynamic duct 56 into which the gas flow 52 occurs. However, it should be understood that configurations which are not so precisely aligned may also be workable, but it must be noted that if the flow angle beta ($\beta$) is not aligned with respect to the aerodynamic ducts 56, a series of shock waves or expansion fans (depending on whether the relative angle of attack of the incoming flow is positive or negative) will be formed to turn the flow to largely match the flow angle through the aerodynamic ducts 56 along centerline $C_{LD}$. Such shock wave or expansion fan systems will result in total pressure loss, which will contribute to a decrease in overall compression efficiency, and reduce the overall compressor ratio achieved for a given speed of blades 46. As an example, a variation in flow incidence angle beta ($\beta$) ranging from about 11.0 to about 8.0 degrees, at inflow Mach numbers of from about 2.0 to about 3.0, respectively, would result in about three (3) percentage points of efficiency loss. Such increased losses and corresponding decreases in stage efficiency may be acceptable in various applications. However, in addition to shock wave or expansion fan conditions resulting in pressure and efficiency loss, adverse shock to boundary layer interaction, and or boundary layer separation issues, may arise as such off-design conditions become more severe, depending upon the strength of the shock wave system and the thickness of the boundary layer system interacting therewith. And, adverse shock wave and accompanying pressure signatures may be expected to reflect from blades 46, especially at the trailing edges thereof, potentially increasing stress and reducing life of blades 46. Consequently, embodiments tending to closely align incoming flow angle beta ($\beta$) with the centerline $C_{LD}$ of aerodynamic ducts 56 should be considered optimal, although not limiting.

Figure 18:
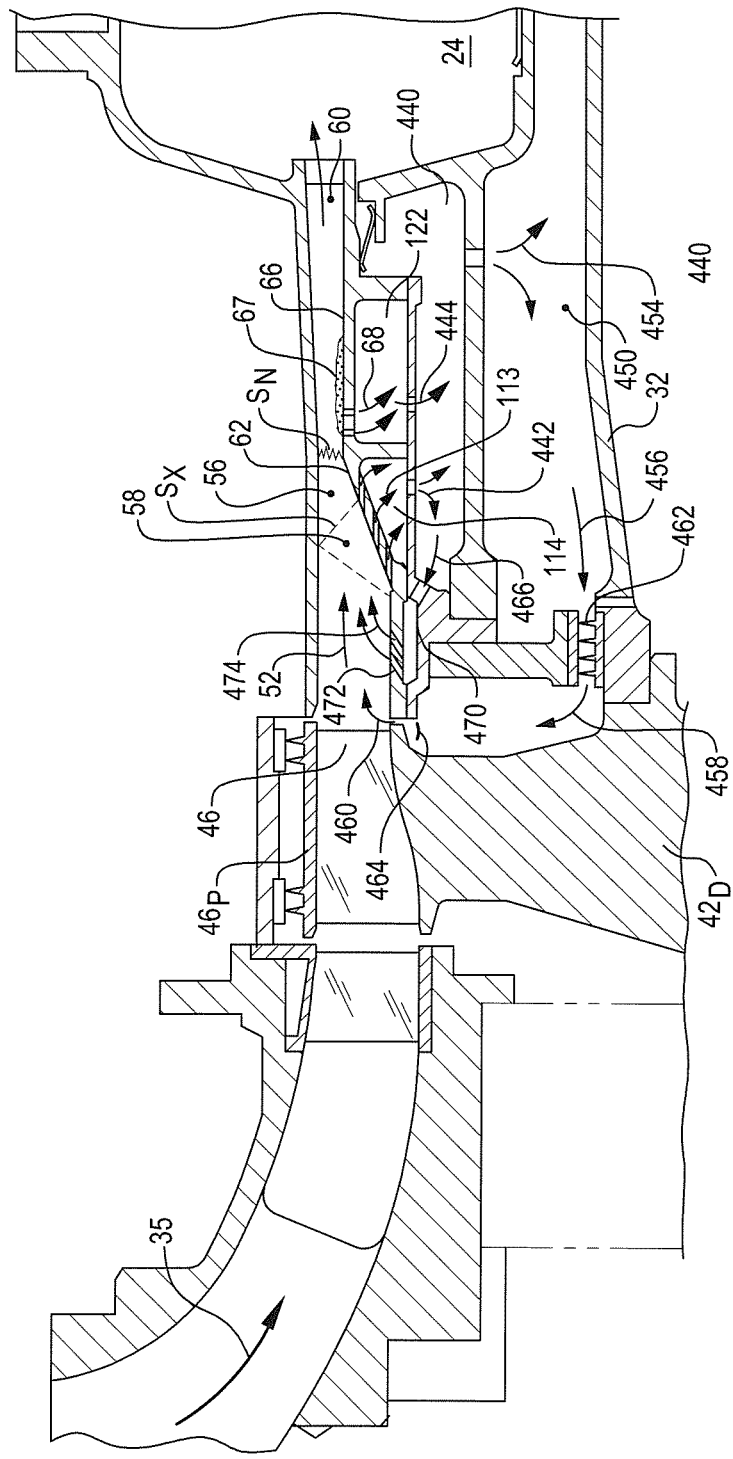
FIG. 18 is a partial cross-sectional view of an embodiment for a gas turbine engine generally configured according to the design first set forth in FIG. 1, now showing in more detail the blade on a compressor rotor, and provided with a downstream stator, showing converging and diverging portions thereof, and which is configured to release compressed air into a pressurized combustor chamber.

As shown in FIG. 3, in an embodiment, a stator 54 may include therein one or more structures that enable startup of a shock wave structure, for example generation and stabilization of the location of the at least one oblique shock $S_X$ and a normal shock $S_N$, at suitable locations such as are indicated in FIGS. 1 and 18. As depicted in FIG. 3, the stator 54 may also include one or more structures that provide for control of boundary layer losses, as more fully addressed below. In an embodiment, bypass gas passageways 62 are provided to remove a portion of incoming gas 52 during startup conditions, so as to adjust the effective contraction ratio of the associated aerodynamic duct 56. In this manner, aerodynamic ducts 56 may be designed for operation at high compression ratios, yet be adapted for startup of a stable supersonic shock wave structure within the aerodynamic duct 56 that ultimately enables transition to high compression ratio operation.

In an embodiment, aerodynamic ducts 56 may include one or more boundary layer control structures, such as bleed ports 64 as seen in FIGS. 1, 3, and 8, for removal of gas from aerodynamic ducts 56 as may be required for control of boundary layer at surface 66 of the aerodynamic duct 56.

Turning again to FIG. 8, as an example for a particular design and without limitation, flow conditions are described for an embodiment for a design within a selected design envelope for a supersonic compressor, for use in a gas turbine engine 20 such as that noted in FIG. 2 above. As shown in FIG. 8, the rotor 42 includes impulse blades 46, moving in the direction indicated by reference arrow 78. The use of an impulse rotor 42 enables efficient turning of the flow of an incoming gas, especially when utilizing a rotor 42 with sharp leading edges 80 and sharp trailing edges 94. At location A, upstream of rotor 42, a small tangential velocity (as compared to tangential velocity after exit from rotor 42 as described below) may be encountered prior to the rotor 42. Upon entry to the rotor 42, gas velocity at location B is accelerated, and moves in the direction indicated by reference line 96. Just prior to leaving the rotor 42 at location C, the gas has been partially accelerated. Finally, after exit from rotor 42, at location D, the gas velocity is at supersonic conditions. Basically, compressor impulse blades 46 allow for a high degree of turning of the incoming gas 35, through an angle alpha ($\alpha$). Thus, in an embodiment, the desired supersonic velocity of gas stream 52 entering the aerodynamic ducts 56 is achieved by a combination of velocity of gas through the blades 46 and the tangential rotation of the compressor rotor 42, including blades 46.

In an embodiment for a supersonic compressor 22 (note components illustrated in FIG. 1) such as illustrated in FIG. 8, the selected inlet gas passing through the blades 46 of the rotor 42 may be turned by an angle alpha ($\alpha$) of at least ninety (90) degrees, at least one hundred (100) degrees, at least one hundred ten (110) degrees, between about ninety (90) degrees and about one hundred twenty five (125) degrees, between about ninety (90) degrees and about one hundred sixty (160) degrees, or between about one hundred twelve (112) degrees and about one hundred fourteen (114) degrees. Details of exemplary designs for various impulse type blades for use in supersonic compressors may be found by those of skill in the art, from various sources. One helpful reference may include a NASA report entitled "Analytical Investigation of Supersonic Turbomachinery Blading—Section II—Analysis of Impulse Turbine Blade Sections", by Louis J. Goldman, Published as Report No. NASA-TN-D-4422, on Apr. 1, 1968, which is incorporated herein by reference, and to which the reader may refer for additional background in implementing an impulse blade in a supersonic compressor design as further taught herein.

As shown in FIG. 1, an embodiment, each of the plurality of compressor blades 46 may have a hub end 90, a tip end 92, and a trailing edge 94. In an embodiment, the compressor blades 46 are provided with supersonic gas flow 52 at their trailing edge 94. In an embodiment, supersonic gas flow 52 at the trailing edge 94 may be from the hub end 90 to the tip end 92 of the trailing edge 94.

Figure 14:
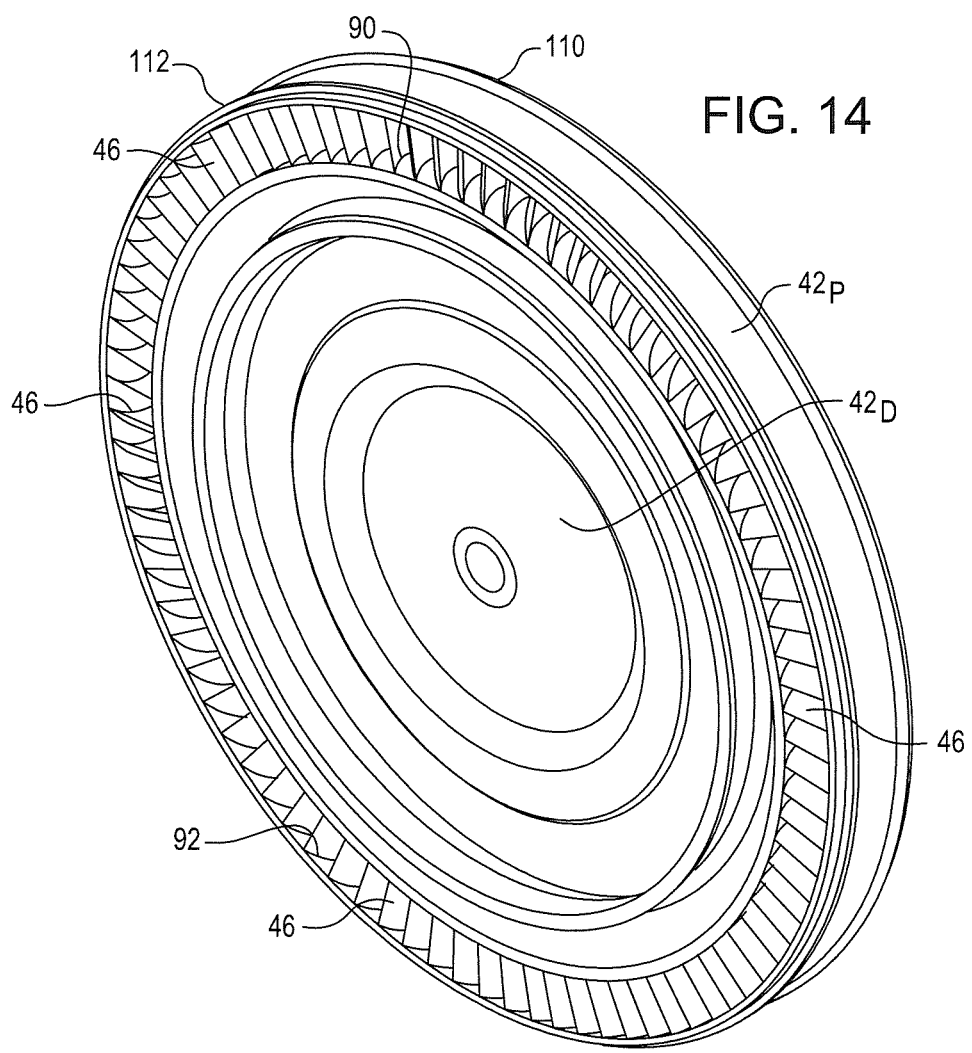
FIG. 14 is a perspective view of an embodiment for an impulse rotor, showing the use of an impulse rotor having a shroud for the blades, and in this embodiment, also showing teeth for a labyrinth type seal structure on the circumferential portions of the rotor shroud.

As shown in FIGS. 1 and 14, in an embodiment, a compressor rotor disc $42_D$ may be provided having a shroud $42_P$ for compressor blades 46. In an embodiment, as noted in FIG. 14, the shroud $46_P$ may include labyrinth seal portions 110 and 112. By use of a labyrinth seal or other suitable seal, such as a honeycomb seal, a dry gas seal, brush seals, or other sealing structures, the rotor 42 may be effectively sealed with respect to a stator 54 and attendant aerodynamic ducts 56, so as to minimize gas leakage during flow therebetween, as may be better appreciated by reference to FIGS. 1 and 3, where shroud $46_P$ of a rotor 42 and peripheral shroud $36_P$ of a turbine 30 are illustrated.

Figure 12:
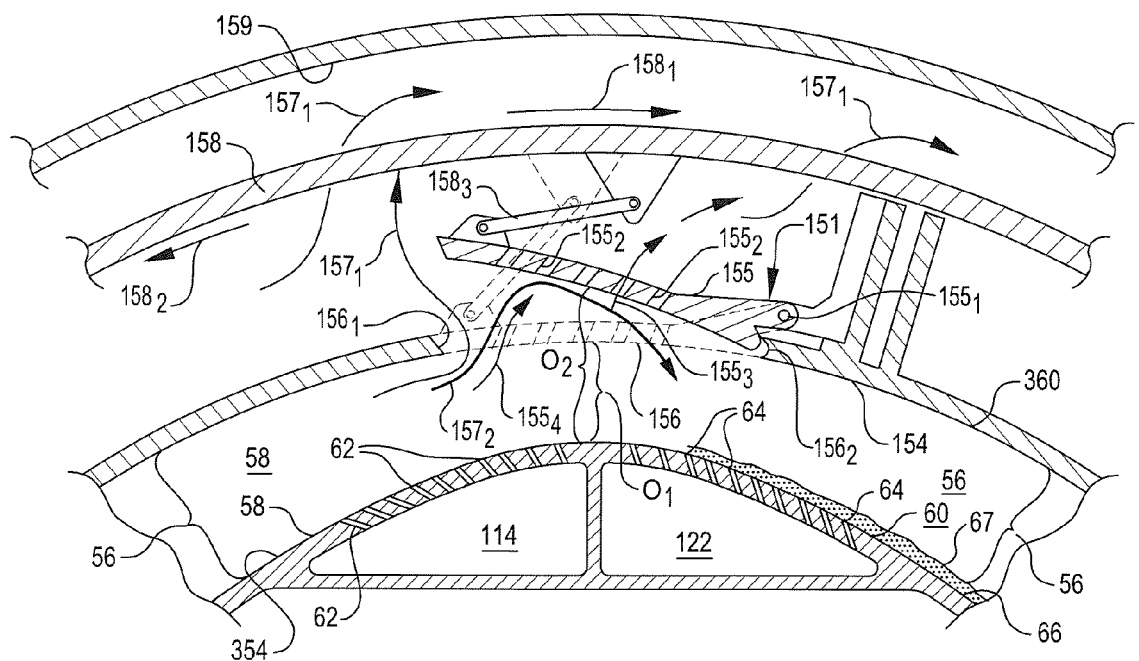
FIG. 12 is a partial cross-sectional view of an embodiment for an aerodynamic duct including converging and diverging portions, illustrating both the use of an openable door for gas removal during starting, and the use of boundary layer bleed systems for control of boundary layer phenomenon.

Attention is directed to FIG. 12, which illustrates an embodiment for a contraction ratio adjuster 151, which may be utilized for achieving startup of a supersonic shock wave in an aerodynamic duct 56. In FIG. 12, a bypass outlet door 155 provides a bypass outlet opening 156 shown in broken lines between end walls $156_1$ and $156_2$ to allow gas shown by reference arrows $157_1$ and $157_2$ to escape the converging portion 58 of the aerodynamic duct 56. In an embodiment, an actuator 158 may be provided to move bypass outlet door 155 back and forth as noted by reference arrows $158_1$ (to open), and $158_2$ (to close), using linkage $158_3$ to pivot bypass outlet door 155 about pivot pin $155_1$. Actuator 158 may be configured not as a gas barrier or pressurizable part, but as a component contained within bypass gas passageway wall 159, and thus, escaping bypass gas $157_4$ may continue past actuator 158 as noted. However, escaping bypass gas noted by reference arrow $157_1$ is contained by bypass gas passageway wall 159, which provides a pressurizable plenum. Once the space contained within bypass gas passageway wall 159 is pressurized, the bypass gas then escapes through the enlarged throat opening $O_2$, and thence downstream of the throat opening $O_2$ as indicated by reference arrow $157_2$. The enlarged area of $A_2$ of throat $O_2$ when in a startup configuration (as compared to an area of $A_1$ of throat $O_1$ when in an operational configuration) enables downstream passage through the aerodynamic duct 56 of bypass gas as indicated by reference arrow $157_2$. In an embodiment, the bypass outlet door 155 may be provided with boundary layer bleed passages $155_2$, for boundary layer bleed as noted by reference arrows $155_3$ and $155_4$.

Figure 13:
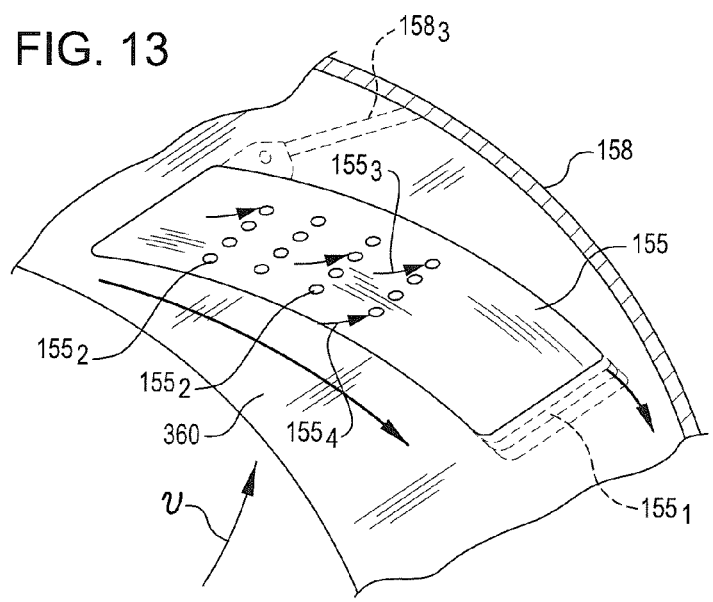
FIG. 13 is a partial perspective view, showing further details of an openable door as just depicted in FIG. 12 above, but now viewing upward in the aerodynamic duct to a door in the closed, operating configuration, and also revealing boundary layer bleed ports for boundary layer control.

FIG. 13 shows a perspective view, taken looking upward or overhead, in the direction of reference arrow U, toward the inside of a radially outward bounding wall 360 (see also FIG. 12) of aerodynamic duct 56, to show bypass outlet door 155. The bypass outlet door 155 is shown in a closed position, for an operating configuration of gas turbine engine 20 (as in FIGS. 1 and 2). Boundary layer bleed passages $155_2$, for boundary layer bleed as noted by reference arrows $155_3$ and $155_4$ are shown in an operational configuration for gas turbine engine 20.

Referring back to FIG. 1, note that as an example, but not as a limitation, the bypass gas passageways 62 may be operable during establishment of a supersonic shock during startup. In such case, effective contraction ratio may be adjusted for startup using a startup system, using bypass gas passageways 62 for collection of a portion 113 of inlet gas. A bypass gas sub-chamber 114 adjacent the converging supersonic diffuser portion 58 may be provided for receiving the collected portion 113 of inlet gas. An outlet valve 116 may be provided from the bypass gas sub-chamber 114 for discharge, during starting, of the collected inlet gas 113.

When the compressor 22 in gas turbine engine 20 is designed for operating at an inlet relative Mach number of about 1.8, for removal of a quantity of from about eleven percent (11%) by mass to about nineteen percent (19%) by mass of the selected gas captured at the inlet by an aerodynamic duct 56. As a further example, but not as a limitation, the bypass gas passageways 62 may be operable during establishment of a supersonic shock during startup, when a compressor is designed for operating at an inlet relative Mach number of about 2.8, for removal of a quantity of from about thirty six percent (36%) by mass to about sixty one percent (61%) by mass of the inlet gas captured at the inlet by an aerodynamic duct 56. Those of skill in the art and to whom this specification is directed will undoubtedly be able to calculate and thus determine suitable bypass gas quantities that may be useful or required for enabling aerodynamic ducts used in a particular stator, given compressor design parameters, to swallow a supersonic shock structure and to thus establish a stable supersonic shock structure at a desired location within the aerodynamic duct(s). Thus, the above noted ranges are to provide to the reader an appreciation of the amount of mass flow that may be required to establish a stable supersonic shock structure, and thus eliminate an un-started condition in the aerodynamic ducts in a stator. Various aspects of starting requirements are discussed by Lawlor, in U.S. Patent Application Publication No. US2009/0196731 A1, Published on Aug. 6, 2009, entitled Method and Apparatus for Starting Supersonic Compressors, which is incorporated herein in its entirety by this reference. In particular, FIG. 3 of that publication provides a graphic illustration of typical ranges suitable for starting bypass gas removal requirements, shown as starting bleed fraction (defined by mass of bypass gas divided by mass of gas captured by the inlet) fraction, for aerodynamic ducts in a supersonic compressor operating at a selected inlet relative Mach number.

More generally, startup of gas turbine engine 20, and more particularly start of a supersonic shock wave, is established by opening a contraction ratio adjuster 151 such as bypass gas passageways like bypass outlet door 155, and then bringing the compressor blades 46 up to full speed. Then, the bypass outlet door 155 may be smoothly closed to bring the throat $O_1$ (FIGS. 1 and 12) of aerodynamic duct 56 into a design area condition which establishes a design contraction ratio for aerodynamic duct 56. At that point, back pressure, that is the static pressure in diverging portion 60 of aerodynamic duct 56, is allowed to rise to establish the design discharge pressure, given the overall pressure ratio for operation. Boundary layer control structures are utilized during operation to control boundary layers, whether by bleed, mixing, injection, combinations thereof, or other suitable means. For shutdown, back pressure is reduced, supply of fuel 26 is terminated, and drive for compressor blades 46 is turned off, and the compressor is allowed to spin to a stop.

With respect to boundary layer control structures, in an embodiment, such structures may be configured as boundary layer bleed ports 64 in the various aerodynamic ducts 56, such as shown in FIG. 1, or in FIG. 8. Such boundary layer bleed ports 64 may be provided by perforations in one or more bounding walls, such as in surface 66 of a diverging portion 60 in an aerodynamic duct 56 as shown in FIG. 1 or 8. Adjacent the boundary layer bleed ports 64 may be bleed sub-chambers, such as sub-chamber 122 as shown in FIG. 1. Thus, a bleed sub-chamber 122 may be provided in fluid communication with boundary layer bleed ports 64, and thus bleed sub-chambers 122 are configured for passage therethrough of gas removed through the boundary layer bleed ports 64. Although the boundary layer bleed ports 64 are shown in a diverging portion 60, such bleed ports may be located in other bounding walls of aerodynamic ducts 56, such as on radially outward portions, or on sidewalls, or on other radial inward portions.

In various embodiments, as shown in FIGS. 3 and 6, the one or more aerodynamic ducts 56 are disposed in a stator 54, and may be wrapped around a longitudinal axis, shown along the centerline $C_{LS}$. In an embodiment, as indicated in FIG. 6, one or more of the one or more aerodynamic ducts 56 of a stator 54 are wrapped as if over a substantially cylindrical substrate 220. In such an embodiment, aerodynamic ducts 56 may be wrapped at a substantially constant helical angle psi (ψ) between the longitudinal axis $C_{LS}$ shown and the longitudinal centerline $C_{LD}$. Alternately, the orientation of aerodynamic ducts 56 may be described by use of the complementary lead angle delta (Δ), as shown in FIG. 6. In an embodiment, the longitudinal centerline $C_{LD}$ of a first aerodynamic duct $56_1$ and the centerline $C_{LD}$ of a second aerodynamic duct $56_2$ (and other ducts in the embodiment) may be parallel. In various embodiments, a helical angle psi (w) of from about forty-five degrees (45°) to about eighty degrees (80°) may be employed. In the designs disclosed herein, it may be advantageous to receive gas in aerodynamic ducts, for example, $56_1$ in FIG. 3 or 5, without turning the flow as delivered from blades 46.

Figure 4:
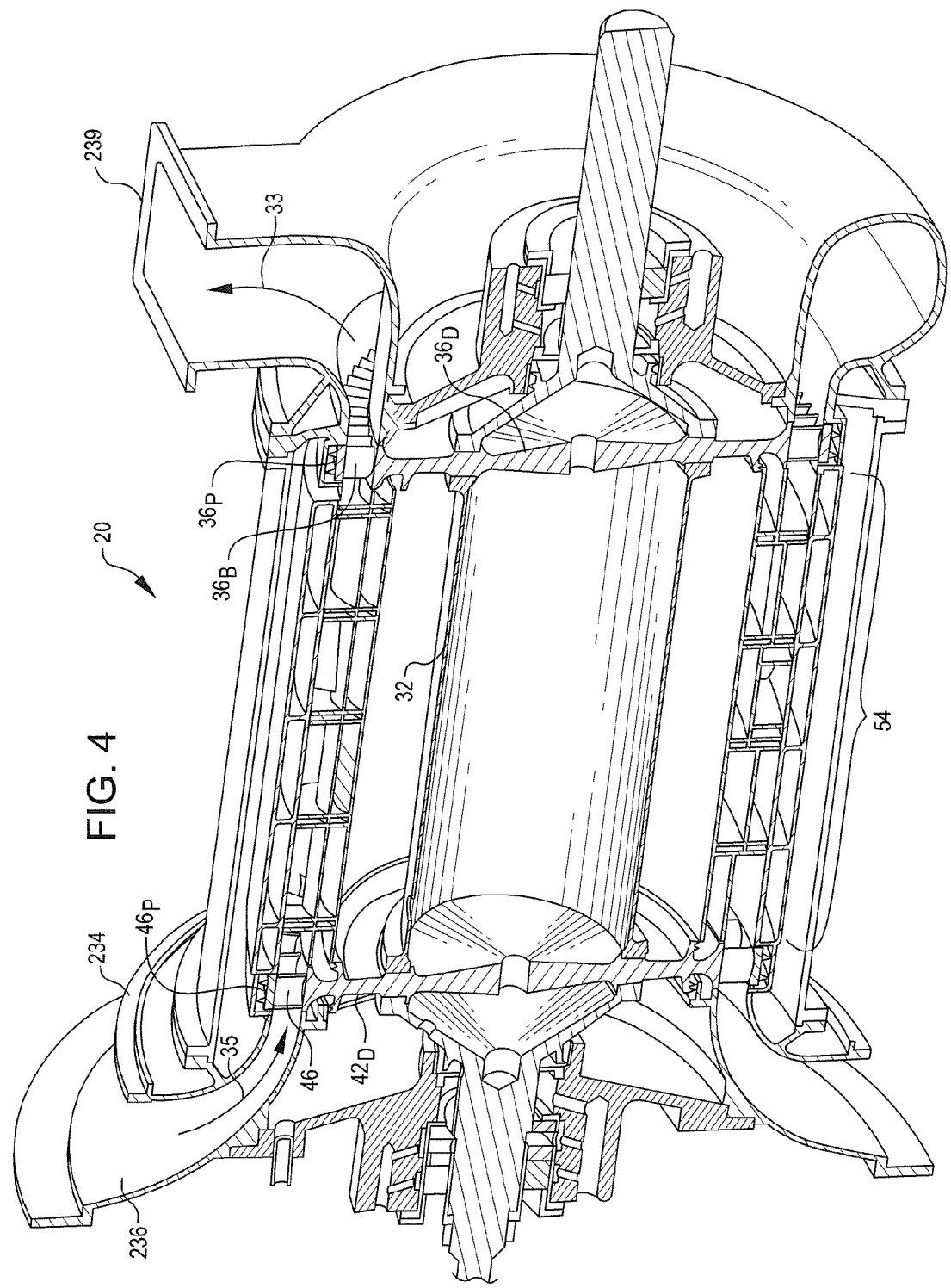
FIG. 4 is a partial cross-sectional view of an embodiment for a gas turbine engine as generally set forth in FIG. 1, now showing in more detail the impulse blades on a compressor rotor and a downstream stationary diffuser that includes a plurality of aerodynamic ducts, showing a helical structure for the aerodynamic ducts having converging and diverging portions, turning vanes to redirect the flow for supply to trapped vortex combustors, and showing a downstream gas turbine rotor and blades.

Overall, as may be envisioned from FIGS. 1 and 4, a gas turbine engine 20 with supersonic gas compressor 22 may be provided for compressing a selected gas 34, where the compressor 22 includes a casing 234 having a low pressure gas inlet 236 and an exhaust gas exit 239. Although compressor rotor 42 with blades 46 may be driven by shaft 32 from gas turbine 30, the choice of driver type and size, and associated drive train components such as a gearbox or bearings etc., may be selected by those of skill in the art for a particular application.

Exemplary aerodynamic ducts 56 may be provided in a stator 54 of the type shown in FIG. 3. Aerodynamic ducts 56 may be designed, i.e., sized and shaped, for an inlet relative Mach number for operation associated with a design operating point selected within a design operating envelope for a selected gas composition, gas quantity, and gas compression ratio. A gas turbine compressor design may be configured for a selected mass flow, that is for a particular quantity of gas that is to be compressed, and that gas may have certain inlet conditions with respect to temperature and pressure (or an anticipated range of such conditions), that must be considered in the design. The incoming gas may be a relatively pure mixture of gases such as ambient air, or may be a mixture of various elements and/or compounds, or the expected supply gas may be expected to range in composition. And, it may be desired to achieve a particular final pressure, when starting at a given inlet gas pressure, and thus, a desired gas compression ratio must be selected for a particular gas turbine compressor design. Given design constraints such as gas composition, mass flow of gas, inlet conditions, and desired outlet conditions the aerodynamic ducts for a particular compressor must be sized and shaped for operation at a selected inlet Mach number and gas compression ratio. The designs described herein allow use of high gas compression ratios, especially compared to self starting supersonic compressor designs that lack the ability to adjust the effective contraction ratio at time of starting the supersonic shock structure. Thus, the designs provided herein provide for compression in aerodynamic ducts which can be started, as regards swallowing a shock structure and establishing a stable supersonic shock configuration during operation, yet retain design features that enable high pressure ratio operation, including oblique shock structure and throat size to support design throughput and compression pressure ratios.

As shown in FIG. 8, aerodynamic ducts 56 in stator 54 may be constructed with leading edges 350. Certain details pertinent to various embodiments are shown in FIGS. 7, 9, 10, and 11. In FIG. 7, an embodiment is shown for a stator 54 having five (5) aerodynamic ducts $56_1$ through $56_5$, and wherein each of such aerodynamic ducts $56_1$ through $51_5$ includes a leading edge 350. Generally, the sharper the leading edge 350, the better performance will be provided, that is, losses will be minimized, when operating at supersonic conditions at the inlet, as compared to use of a leading edge that is not as sharp. As noted in FIG. 11, in an embodiment, a leading edge 350 may be provided having a leading edge radius R of from about 0.005 inches to about 0.012 inches. Further details are noted in FIG. 9, where it can be seen that the leading edge 350 may be provided using a sharp leading edge wedge angle theta (θ), which may in an embodiment be between about five (5) degrees and about ten (10) degrees. Also, as seen in FIG. 10, leading edge 350 may be provided sloping rearward, i.e. in a downstream direction at a slope angle mu (μ) as measured between the leading edge 350 and a tangent line 352 with underlying radially inward bounding wall 354. Such sloping leading edge 350 may start at a lower front end 356 and end at an upper rear end 358. The leading edge 350 may be sealed to or affixed to a radially-inward bounding wall 354 at the lower front end 356, and may be sealed to or affixed to (for example, using welded assembly) or otherwise sealingly provided (for example, machined from a common workpiece) with respect to radially outward bounding wall 360 at the upper rear end 358 of leading edge 350.

Figure 9:
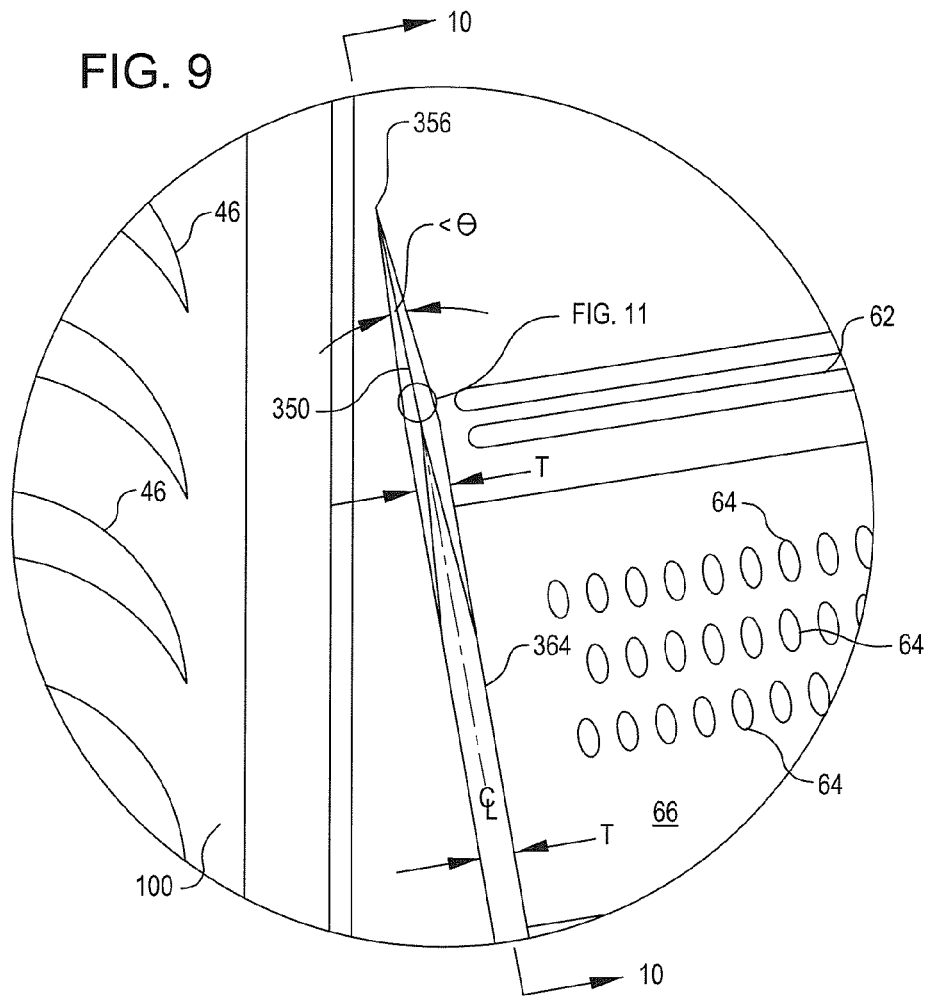
FIG. 9 is an enlarged portion of FIG. 8, showing a leading edge wedge angle for a stator, and a partition wall located rearward, i.e. downstream therefrom, which, in an embodiment, may be configured as a common partition to separate adjacent aerodynamic ducts in a stator.
Figure 10:
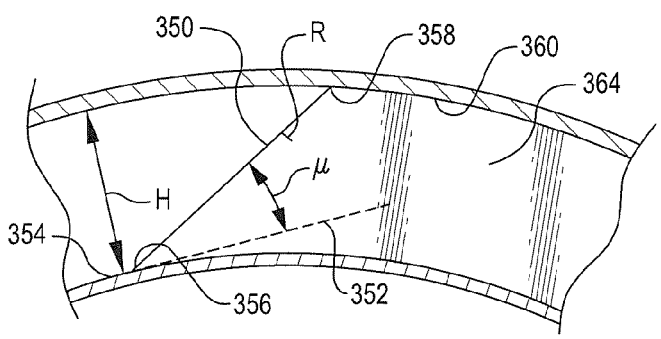
FIG. 10 is cross-section taken across line 10-10 of FIG. 9, showing a leading edge for an aerodynamic duct, and more specifically, how a leading edge may, in an embodiment, be provided in a swept-back configuration, that is sloping rearward in the flow-wise direction.
Figure 11:
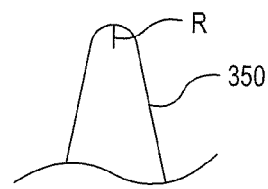
FIG. 11 is an enlarged portion of FIG. 10, showing a suitable radius for a leading edge of an aerodynamic duct.

As seen in FIGS. 9 and 10, rearward (flow-wise, in the downstream, gas flow direction) from leading edge 350, a partition wall 364 may be utilized. In various embodiments, for example as seen in FIGS. 8, 9, and 15, a common partition wall 364 may be utilized between adjacent aerodynamic ducts 56 for example, between individually identified aerodynamic ducts $56_1$, $56_2$, etc., through duct $56_5$ as depicted in FIGS. 5 and 9. As shown in FIG. 8, partition walls 364 are individually identified as partition walls $364_1$, $364_2$, $364_3$, etc. as appropriate given the number of aerodynamic ducts 56 utilized. In various embodiments, a leading edge 350 may provide an upstream terminus for a partition wall, such as partition wall 364.

Figure 16:
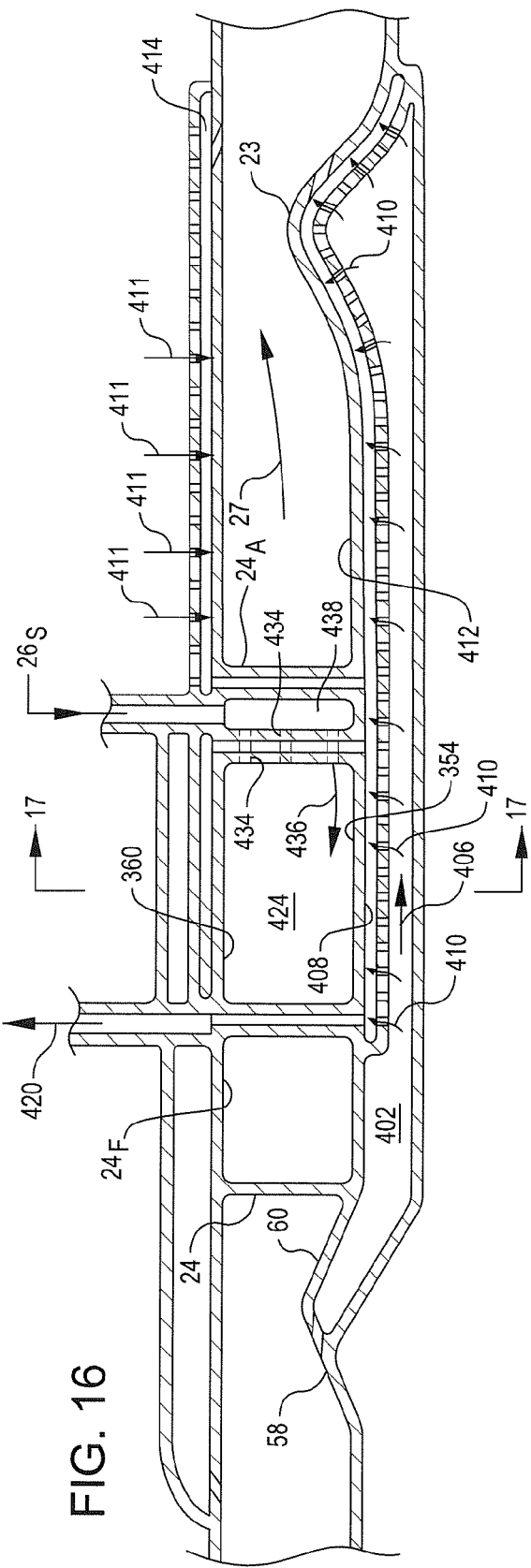
FIG. 16 is a partial cross-sectional view of an exemplary aerodynamic duct, showing a compression ramp, a trapped vortex combustor, a supply line for providing secondary fuel to secondary fuel injectors, and a downstream choke, as well as cooling passageways between adjacent partition walls.
Figure 17:
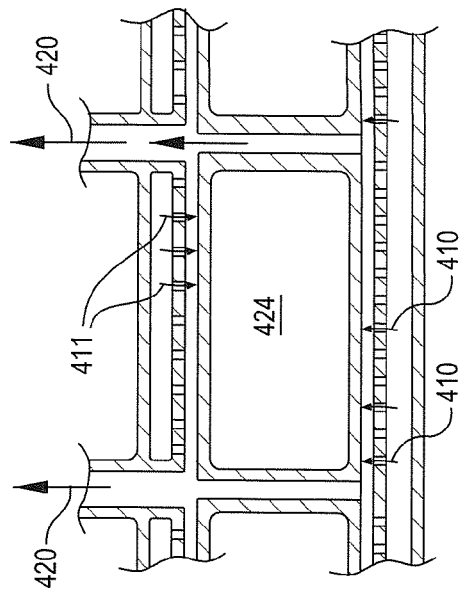
FIG. 17 is a cross-sectional view, taken along line 17-17 of FIG. 16, revealing cooling passageways adjacent a trapped vortex combustor.

As illustrated in FIG. 15, as an example, partition walls $364_1$ and $364_5$ may be provided with split portions, $364_{1A}$ and $364_{1B}$, on one side of aerodynamic duct $56_1$, and as $364_{5A}$ and $364_{5B}$, on the other side. In gas turbine engines, where dissipation of heat generated in a combustor 24 is of concern, cooling passages 400 may be provided within, and between at least a portion of partition walls, such as walls $364_{1A}$ and $364_{1B}$. In FIG. 16, cooling air passageways 402 are also shown below cavity 424 in combustor 24, for entry of cooling air 406 to base 408 of combustor 24, as indicated by arrows 410. Likewise, cooling may be provided to the base 412 of the aerodynamic duct, downstream of the combustor 24, which is in contact with hot pressurized combustion gases 27. Similarly, as noted in both FIGS. 16 and 17, cooling to the outward surface 420 of aerodynamic duct downstream of combustor 24 may be provided by cooling air 411 in double walled coolant passageway 414. Outward sweep of coolant air is shown by arrows 420 in FIGS. 16 and 17, but various designs may be provided for such cooling, and these exemplary embodiments should be considered suggestive, not exclusive.

Figure 15A:
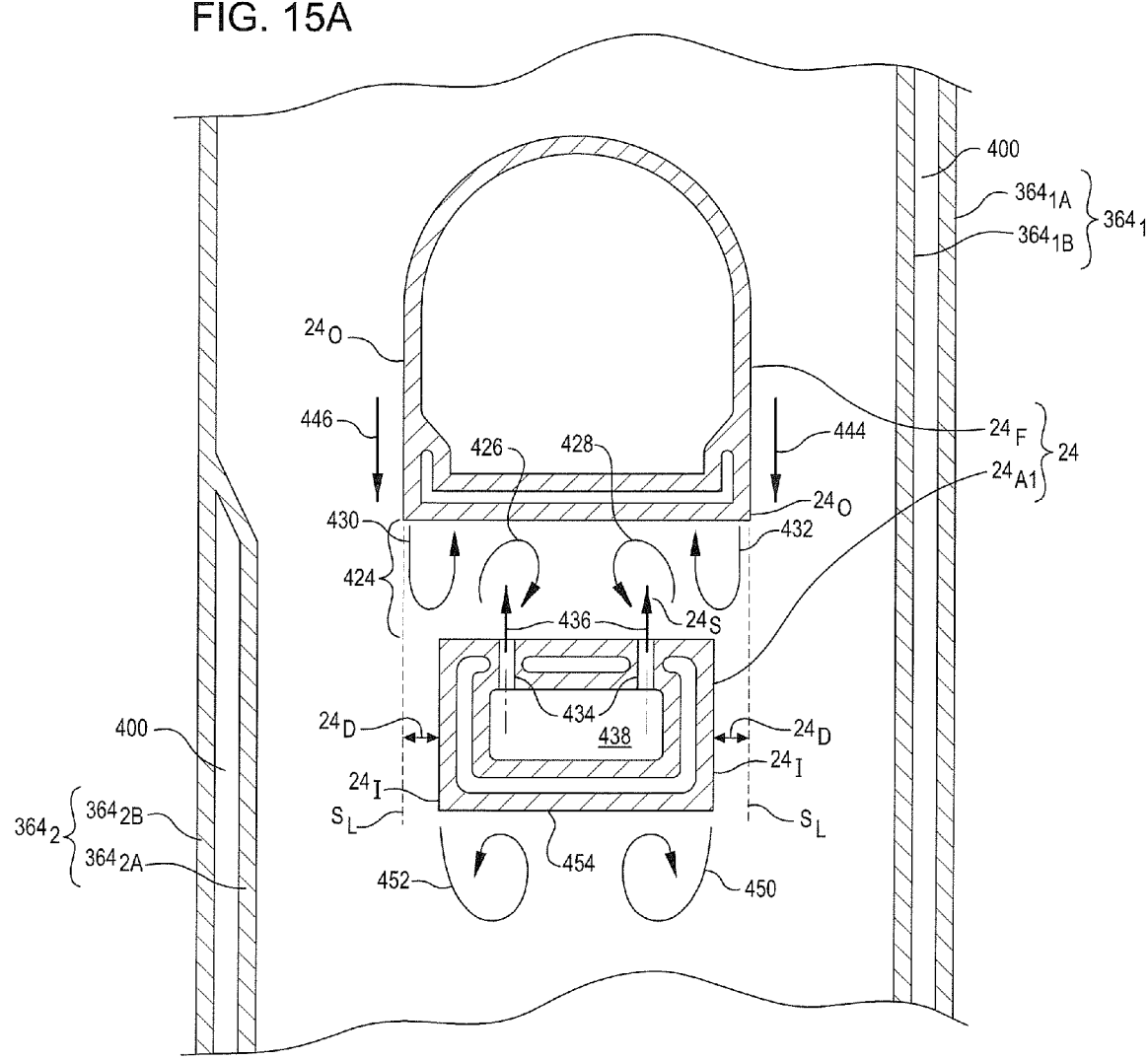
FIG. 15 is a partial cross-sectional view of an aerodynamic duct, showing the details for an embodiment of a trapped vortex combustor, and revealing a flame holding cavity between a forebody portion and an aft body portion of the trapped vortex combustor, as well as revealing a fuel supply chamber and fuel injection port locations.

A flameholder, which in an embodiment may be provided as combustor 24, or more specifically in the form of a trapped vortex combustor, is seen in more detail in FIGS. 15 and 15A. A forebody $24_F$ and an aft body $24_A$ define therebetween a cavity 424 and thus, in an embodiment, define at least one flameholder for locating stabilized vortices 426, 428, 430, and 432, of burning gases. The stabilized vortices 426, 428, 430, and 432 are fed by a lean premixed fuel $26_L$ (FIG. 2) arriving from upstream as noted by reference arrows 444 and 446. Fuel 26 may be provided via primary fuel $26_P$, via secondary fuel $26_S$, and optionally via auxiliary fuel $26_A$, as noted in FIGS. 1 and 2. The primary fuel $26_P$ may be injected by a fuel supply mechanism such as primary fuel injectors 448 located upstream of combustor 24, in order to supply lean fuel mixture $26_L$ to the combustor 24. When suitable (based on temperature reached during compression, ignition temperature of resultant fuel/air mixture, actual fuel(s) used, etc., as will be understood by those of skill in the art), the auxiliary fuel $26_A$ (shown in broken lines in FIG. 1) may be provided for injection at auxiliary fuel injectors 449 adjacent to inlet 53 of the supersonic diffuser converging inlet portion 58 of an aerodynamic duct 56. When auxiliary fuel $26_A$ is used, fuel-air mixing also occurs during combustion gas compression. In any case, as shown in FIGS. 15 and 15A, a lean pre-mixed fuel arrives as indicated by reference arrows 444 and 446, as a result of mixing of primary fuel $26_P$ with incoming compressed gas. The incoming gas for compression may be ambient air in many cases. However, it will be understood by those of skill in the art that the described gas turbine engine 20 design may be used with other oxidants and fuel sources as might be encountered in various industrial applications. As shown in FIG. 15, and in FIG. 15A, the use of secondary fuel injectors 434 is noted, showing fuel jets 436 of secondary fuel $26_S$ (as noted in FIGS. 1 and 2 above) supplied by secondary fuel passageway 438. The fuel jets 436 help stabilize the burning gases in the cavity 424. Note that vortices 450 and 452 may be formed behind the rear wall 454 of aft body $24_A$ (or aft body $24_{A1}$ in FIG. 15A) and thus when present, the aft body $24_A$ or aft body $24_{A1}$ may also be considered a part of the overall flameholder structure, and may provide at least a second flameholder structure.

As noted in FIG. 15A, in an embodiment, a small aft body $24_{A1}$ may be provided (as compared to aft body $24_A$ illustrated in FIG. 15. As noted in FIG. 15A, in such an embodiment, aft body $24_{A1}$ has a sidewall $24_1$ which is located inwardly by a distance $24_D$ from a slipstream line $S_L$ running rearward from the outer wall $24_O$ of forebody $24_F$. Use of a smaller aft body $24_{A1}$ may allow development and stable location of suitable trapped vortex structures.

In a gas turbine engine 20, fuel 26 may be provided as a liquid fuel, such as a conventional hydrocarbon fuel commercially available for firing of gas turbine engines. Or, the gas turbine engine 20 may burn a gaseous fuel 26, such as conventional hydrocarbon fuels commercially available for firing gas turbine engines, including natural gas. Notably, a gas turbine engine 20 as described herein may be able to burn a wide variety of fuels, considering the high speed operation and the flame stability provided by trapped vortex combustors utilized. Further details for an embodiment of suitable trapped vortex combustors and related fuel details may be found in U.S. Pat. No. 7,603,841 B2, issued Oct. 20, 2009, to Steele et al., and assigned to Ramgen Power Systems, LLC, and entitled Vortex Combustor for Low NOx Emissions When Burning Premixed High Hydrogen Content Fuel, the disclosure of which, including specification, drawings, and claims, is included herein in its entirety by this reference.

In general, as seen in FIG. 12, aerodynamic ducts 56 are formed between an outward bounding wall 360, and an inward bounding wall 354, each of which, in an embodiment, may be radially disposed with respect to the other. Downstream, as seen in FIG. 16, a trapped vortex combustor 24, including the forebody $24_F$ and the aft body $24_A$ may also be formed between, and thus provided and extending between a radially outward bounding wall 360 and a radially inward bounding wall 354.

As may be appreciated by reference to FIGS. 3, 4, and 5, design for stator 54 may include aerodynamic ducts 56 which are polygonal in cross sectional shape. Such shape may include a variety of bounding walls, such as a floor, ceiling, and sidewalls. As used herein, the term radially inward bounding wall as been used to describe what might be also be considered a floor of an aerodynamic duct. As used herein, the term radially outward bounding wall has been used to describe what might be also considered a ceiling of an aerodynamic duct. As earlier noted, in an embodiment, aerodynamic ducts 56 may have a flow centerline $C_{LD}$ as shown in FIG. 8. Then, in an embodiment, orthogonal to the centerline line $C_{LD}$, the aerodynamic ducts 56 may be provided having a parallelogram cross-sectional shape, which may in an embodiment be in a generally rectangular cross sectional shape at various points along the aerodynamic duct 56. In an embodiment, the centerline $C_{LD}$ may be oriented in a generally helical configuration. The height H of such a cross-section is shown in FIG. 10, seen radially outward from a radially inward bounding wall 354 toward a radially outward bounding wall 360, at an entrance location to an aerodynamic duct 56, namely the lower front end 356 of leading edge 350. The width W of such a cross-section is depicted in FIG. 8 as between (and within) adjacent partition walls $364_{1B}$ and $364_{2A}$. In an embodiment, associated with the just noted cross-sectional shape, the aerodynamic ducts 56 may have an average aspect ratio, expressed as width W to height H, of about two to one (2:1), or more. In an embodiment, the aerodynamic ducts 56 may have an average aspect ratio, expressed as width W to height H, of about three to one (3:1), or more. In an embodiment, the aerodynamic ducts 56 may have an average aspect ratio, expressed as width W to height H, of about four to one (4:1), or more.

In various embodiments, the number of aerodynamic ducts 56 in a stator 54, such as depicted in FIGS. 3, 4, and 5, may be selected as useful given other design constraints. The number of aerodynamic ducts 56 included may be one or more, and more generally, in the range of from 1 to 11, or more, for example, 3, 5, 7, 9, or 11. The number of aerodynamic ducts 56 for a given design may be selected as part of a design exercise that takes into account various factors including the direction of gas flow leaving the rotor blades 46, and the velocity provided thereby, and the degree of growth of adverse boundary layers in configurations of various geometry and the number of combustors 24 desired for a given application to deliver the necessary hot pressurized combustion gases 27 (see FIG. 1, 19, or 20) for a selected power output. In an embodiment, the number of leading edges 350 (see FIGS. 8 and 10) for an inlet in a stator 54 may be equal to the number of aerodynamic ducts 56 in a stator 54. In many embodiments, design optimization may result in a plurality of aerodynamic ducts 56, so that velocity of gas leaving a compressor blade 46 is maximized and boundary layer growth is minimized. In such embodiments, when optimizing a compressor design, an odd number 3, 5, 7, 9, or 11 of aerodynamic ducts 56 may be provided, and as just mentioned above, the number of leading edges 350 such stators 54 would be eleven (11), or less. Generally, an unequal number of (1) blades on a rotor and (2) leading edges in an aerodynamic duct, are selected. By selection of an odd number of blades 46 in a compressor rotor 42 (see FIG. 1), an even number of aerodynamic ducts 56 may be provided, for example, 2, 4, 6, 8, 10, or more. Similar considerations must be taken into account in the selection of the number of turbine blades $36_B$. In related parameters, in an exemplary stator 54, the number of leading edges 350 in a stator 54 (see FIGS. 5, 7, and 8) would be about one half (½) or less than the number of blades 46 provided in a rotor 42. In another embodiment, the number of leading edges 350 in a stator 54 would be about one quarter (¼) or less than the number of blades in a rotor 42. In a yet more efficient design, it is currently anticipated that the number of leading edges 350 in a stator 54 would be about fifteen percent (15%), or less, of the number of blades in a rotor 42. Minimizing the number of leading edges, and related aerodynamic ducts, minimizes drag and efficiency loss compared to various prior art stators, particularly those prior art designs utilizing stator blades in number commensurate with or equivalent to the number of rotor blades provided.

More generally, a gas turbine engine including a compressor and turbine as described herein may be designed for providing gas to aerodynamic ducts, such as aerodynamic duct $56_1$, as seen in FIGS. 5 and 6, at an inlet relative Mach number in excess of about 1.8. Further, a compressor may be designed for an inlet relative Mach number to aerodynamic ducts of at least 2. Even further, a compressor for a gas turbine engine as described herein may be designed for an inlet relative Mach number to aerodynamic ducts of at least 2.5. And, operation of supersonic compressors described herein is anticipated to be possible at designs having an inlet relative Mach number to aerodynamic ducts in excess of about 2.5. For many applications, a practical design is anticipated to utilize an inlet relative Mach number to aerodynamic ducts between about 2 and about 2.5, inclusive of such bounding parameters. Further, for various applications, as an example and not as a limitation, practical designs may be anticipated to utilize an inlet relative Mach number to aerodynamic ducts in the range of between about 2.5 and about 2.8. Consequently, the Mach number achievable for various designs should not be considered limited by such above noted suggestions, as an evaluation of design Mach numbers for particular applications may include a variety of design considerations.

Gas turbine engines with compressors as described herein may be provided for operation within a design operating envelope having overall gas compression ratio greater than about seven to one (7:1). In yet other applications, compressors as described herein may be provided for operation within a design operating envelope having an overall pressure ratio in the range of from about ten to one (10:1) to about twenty to one (20:1). In an embodiment, the gas turbine engine described herein may be provided for operation within a design operating envelope having an overall compression ratio in a stage of compression of from about twelve to one (12:1) to about thirty to one (30:1). In an embodiment, the gas turbine engine described herein may be provided for operation within a design operating envelope having an overall compression ratio in a stage of compression of from about thirty to one (30:1) to about forty to one (40:1) In an embodiment, the gas turbine engine described herein may be provided for operation within a design operating envelope having an overall compression ratio in a stage of compression of greater than about twenty to one (20:1). In an embodiment, wherein overall pressure ratio is about fifteen to one (15:1) or more, the gas turbine engine described herein may have a thermal efficiency of about thirty five percent (35%) or more. In an embodiment, wherein overall pressure ratio is about twenty to one (20:1) or more the gas turbine engine described herein may have a thermal efficiency of about forty five percent (45%) or more.

Increasing operational overall pressure ratio of the compressor of a gas turbine engine may provide increased thermal efficiency, and thus better ratio of power output to energy (fuel) input. In one example, the compression may be effectively accomplished using the compressor configuration(s) taught herein utilizing rotors with high strength and using a shrouded blade configuration. Such a design must be able to operate at high rotational rates to provide sufficient peripheral speed in order achieve a suitable supersonic design velocity at time of entry of gas to the aerodynamic ducts of a stator. Further advances in materials and manufacturing techniques may enable designs at even higher speeds and pressure ratios, or may provide reduced risk of mechanical failures when operating at or near the conditions noted herein.

Further to the details noted above, it must be reiterated that the aerodynamic ducts described herein may be utilized in configurations built on various substrate structural designs, and achieve the benefit of high compression ratio operation, while providing necessary features for starting of supersonic operation. In various embodiments, a plurality of aerodynamic ducts may be configured as if wrapped about a surface of revolution, as provided by such static structure. In an embodiment, a suitable static structure may be substantially cylindrical, and thus, in an embodiment, the ducts may be configured wrapped around the cylindrical structure. In an embodiment, the aerodynamic ducts of a stator may be provided in a spiral configuration. In an embodiment the aerodynamic ducts of a stator may be provided in helical or helicoidal configuration, such as may be generated along a centerline by rotating an entrance plane shape about a longitudinal axis at a fixed rate and simultaneously translating it in the downstream direction of the longitudinal axis, also at a fixed rate. Thus, the term wrapped around a longitudinal axis shall be considered to include wrapping around such various shapes, as applicable.

In summary, the various embodiments using aerodynamic ducts as taught herein provide significantly improved performance over prior art bladed stator designs operating at supersonic inlet conditions, particularly in their ability to provide high total and static pressure ratios. In one aspect, this is because utilizing a minimum number of aerodynamic ducts, and associated leading edge structures, reduces loss associated with entry of high velocity gas into a stator. Moreover, the reduced static structure correspondingly reduces compressor weight and cost, especially compared to prior art designs utilizing large numbers of conventional airfoil shaped stator blades. Thus, incorporation of the novel compressor design described herein enables construction of a high efficiency, yet small and compact, gas turbine engine.

Many benefits may accrue by utilizing a method of operating a compact gas turbine engine 20 as provided herein. Power to weight ratio is expected to be quite high, compared to presently available equipment, particularly in the 0.5 megawatt (MW) to about 3 megawatt (MW) size. And, given the rather high thermal efficiencies when running higher overall pressure ratios, fuel savings may be available in many applications by use of a compact gas turbine generator as provided herein.

A method of operating a gas turbine engine 20 can be understood by reference to FIG. 1, and references in this and the following paragraph may be considered to refer to components similarly identified, without the necessity at this point of repeating the identification of each specific component. A method for operating a gas turbine engine involves providing a compressor rotor having a plurality of compressor impulse blades sized and shaped to increase velocity of air received from said inlet gas passageway from a relative subsonic velocity to a relative supersonic velocity. A stator is provided downstream of the compressor impulse blades. In an embodiment, a stator may include a plurality of aerodynamic ducts. As illustrated in FIG. 1, the aerodynamic ducts 56 may each include: (1) a supersonic diffuser including a portion having a converging cross-sectional area in a flow-wise direction, for receiving gas such as air at supersonic velocity and decelerating the same using shock structures including at least one oblique shock, (2) a subsonic diffuser, the subsonic diffuser including a portion having diverging cross-sectional area in a flow-wise direction, for decelerating the air to convert kinetic energy to pressurized air, (3) a throat, the throat located between said to supersonic diffuser and said subsonic diffuser and including a portion having minimal cross-sectional area within the aerodynamic duct, (4) a fuel supply mechanism for supply of fuel, (5) a flameholder spaced downstream from the throat sufficiently to accept pressurized air from the subsonic diffuser, and (6) a choke. Fuel, which may be a liquid fuel, or a gaseous fuel such as natural gas, is provided to flameholders, which may be provided in the form of trapped vortex combustion burners that provide one or more flameholding cavities. The fuel, which may include lean premixed fuels, is combusted to generate combustion gases having increased pressure and temperature, as compared to the pressurized air. A gas turbine is provided, located downstream of the choke. The gas turbine may include a turbine shaft, a turbine disc, and a plurality of impulse turbine blades associated the turbine disc and configured to receive the combustion gases from the aerodynamic ducts. The gas turbine extracts power from said combustion gases to produce shaft power. After passage through the turbine, the combustion gas is discharged.

For starting of the gas turbine compressor, a contraction ratio adjuster may be provided. A contraction ratio adjuster may have a startup configuration wherein a contraction ratio in aerodynamic ducts is decreased, so as to allow inlet gas to bypass the throat, and an operating configuration, wherein inlet gas bypass of the throat is effectively eliminated. In an embodiment, a contraction ratio adjuster may be provided in the form of bypass outlet doors. The bypass outlet doors may be moveable between an open, startup configuration wherein gas escapes from aerodynamic ducts containing the bypass outlet door, and a closed, operating configuration, where gas passing through the aerodynamic duct is effectively contained therein, save for any boundary layer bleed or other service loss, such as cooling gas. In a method of operating a contraction ratio adjuster, the contraction ratio adjuster may further include and work in concert with, a pressurizable plenum. A suitable pressurizable plenum confines gas escaping an aerodynamic duct through a bypass outlet door, and allows return of the gas to an aerodynamic duct downstream of the throat.

In various embodiments of a gas turbine engine 20 as provided herein, and in various methods of operating such gas turbines, an overall pressure ratio of about ten to one (10:1) or larger may be provided, with a thermal efficiency of about thirty five percent (35%) or more. In an embodiment, an overall pressure ratio may be provided in the range of from about fifteen to one (15:1) to about twenty to one (20:1). In an embodiment, an overall pressure ratio of about fifteen to one (15:1) or larger, or may be provided, with a thermal efficiency of about forty two percent (42%) or more. In another embodiment, an overall pressure ratio of about twenty to one (20:1) or more may be provided, and the thermal efficiency may be at about forty two percent (42%) or more, for example, at about forty five percent (45%) or more. In an embodiment, an overall pressure ratio in the range of from about twenty to one (20:1) to about thirty to one (30:1) may be provided, and the thermal efficiency may be in the range of from about forty percent (40%) to about forty five percent (45%), or more, for example, at about forty two percent (42%) or more. In an embodiment, an overall pressure ratio in the range of from about thirty to one (30:1) to about forty to one (40:1) may be provided, and the thermal efficiency may be in the range of from about forty percent (40%) to about forty five percent (45%), or more, for example, at about forty two percent (42%) or more.

The compressor section of the gas turbine engine 20 utilizes a shock wave compression process that combines a rotor with a downstream supersonic shock diffuser, or stator, to achieve exceptionally high compression ratios and efficiencies simultaneously. The turbine section utilizes a supersonic expander section, that is, a nozzle/choke, followed by one or more turbine rotor(s). In an embodiment, high subsonic velocity hot combustion exhaust gases leave the supersonic nozzle/chock expander, and impinge on the blades of the turbine rotor(s). In an embodiment, the one or more turbine rotor(s) are matched to the compressor rotor. In an embodiment, the compressor and at least one of the one or more turbine rotor(s) may be mounted at opposite ends of a common shaft 32. In an embodiment, the combustor section may be stationary. In an embodiment, the diffuser/stator and the nozzle/choke sections may be stationary. Various components may be provided about shaft 32, to form a core for the gas turbine engine 20.

In one aspect, the turbine rotor inlet temperature, commonly abbreviated as "TRIT", may be maintained at an elevated temperature in the gas turbine engine disclosed herein, as compared to prior art designs. In conventional turbine designs the turbine rotor inlet temperature TRIT is limited by the combination of thermal and rotating stresses that act on the rotating turbine components which are normally located immediately downstream of the combustor section. In some prior art designs, blade cooling and advanced materials are used in order to elevate the TRIT as a means to improve overall engine efficiency (but at substantial added cost), and consequently, such solutions are usually implemented only in larger size units. In contrast, in the gas turbine engine designs described herein, the key gas temperature parameter, that is the turbine rotor inlet temperature (TRIT), may be maintained at a significantly elevated temperature, since when such gas temperature is actually carefully considered relative to the moving reference plane, such gas temperature is significantly lower—in such reference plane—than found in conventional gas turbine designs as at time such hot gases engage the turbine blades.

In so far as we are aware, the current most advanced state-of-the art for TRIT is about 1600° C. (2912° F.) at a pressure ratio of about 23:1 and with power output in the range of about 320 MW to 460 MW. However, since various embodiments of the gas turbine engine design set forth herein place the turbine rotor components downstream of both the combustor 24 section and the nozzle/choke 23 expander section, significant pressure and temperature reductions occur by the time the hot exhaust gas flow reaches the rotating component interface, that is, reaches the rotating components of the gas turbine. Thus, in the designs described herein, the TRIT can be, and is designed for and maintained at significantly elevated temperatures, because in the disclosed gas turbine engine configuration, the structural components exposed to the peak cycle gas temperatures are stationary components (e.g., in an embodiment, the outlet of combustor 24 and the nozzle/choke 23 components). Such stationary components have a much wider range of material choices for use in their respective service at the high temperatures presented, and as regards applicable temperature limits of such materials during operation.

For a calorically perfect ideal process gas, the temperature at the turbine rotor can be determined using the following formula $$T_2 = T_1 \cdot \left[\frac{P_2}{P_1}\right]^{\left(\frac{k-1}{k}\right) \eta_{poly\text{-}turbine}}$$

where:
T1 is the combustor discharge temperature
T2 is the nozzle/choke exhaust temperature (TRIT)
P1 is the turbine section inlet pressure
P2 is the turbine section exhaust pressure
k is the ratio of specific heats
$\eta_{poly\text{-}turbine}$ is the turbine polytropic efficiency As can be seen, the pressure/expansion ratio and the temperature ratio can be raised together in the cycle design for a particular gas turbine engine, to applicable limits of sustainable material temperatures at the shock expander section-rotor interface. Thus, a higher peak cycle gas temperature, that is, the TRIT, improves overall cycle efficiency for a particular gas turbine engine design.

With respect to turbine efficiency and expansion ratio, the supersonic expander and rotor combination taught herein can achieve single stage expansion with corresponding turbine polytropic efficiency levels of over 91%. Yet, even at such expansion ratios, the turbine rotor experiences inlet gas temperatures of only about 1200° F., while the combustor discharge, and therefore the thermodynamic peak cycle gas temperatures, could be as high as 2500° F. Consequently, the disclosed gas turbine engine architecture, which places the turbine rotor downstream of the hot exhaust gas supersonic nozzle/choke section, allows the use of a TRIT that is significantly greater than current industry practice which utilizes blade cooling to compensate for significantly elevated turbine rotor inlet temperatures (TRITs), and thus allows conventional metallurgy components with no cooling, yet still approaches allowable peak cycle gas temperatures of cooled turbine rotor designs.

The gas turbine engine described herein can thus achieve exceptionally high single-stage compression ratios, in part, due to the use of boundary layer control techniques utilized with a shock compression process. In an embodiment, such technique bleeds a boundary layer off the compression surfaces, thus providing exceptionally clean flow throughout the compression process. In many prior art designs, bleed flow is treated as a parasitic loss to the cycle efficiency. However, in an embodiment, in the gas turbine engine described herein, the bleed flow is first used to provide on-engine combustor liner cooling, and then may be re-injected into the turbine working fluid in the turbine expansion section, however, upstream of the turbine rotor itself, thus allowing for full recovery of compressor bleed and any heat associated with combustor liner cooling. Such effects in the gas turbine engine architecture described herein allow the gas turbine engine 20 to operate at substantially higher pressure ratios and therefore substantially higher TRIT as well, as compared to conventional gas turbine engine designs.

Attention is further directed to FIG. 18, which provides a partial cross-sectional view of an embodiment for a gas turbine engine 20 generally configured according to the design first set forth in FIG. 1, showing a blade 46 of a compressor rotor 42, and showing an embodiment for a downstream stator 54. As depicted, the converging portion 58 include bypass gas passageways 62, with associated bypass gas sub-chamber 114, which may be utilized during operation for collection of gas 113 associated with boundary layer control, for example in an embodiment at a pressure in sub-chamber 114 of about 200 pounds per square inch (psi). Likewise, boundary layer gas 67 may be removed from diverging portion 60 via bleed ports 64 as also seen in FIG. 8 above, for removal of gas 68 from aerodynamic ducts 56, sending gas 68 to sub-chamber 122 therebelow, for example in an embodiment at a pressure in sub-chamber 122 of about 250 pounds per square inch (psi). An intermediate chamber 440 may be operated at a reduced pressure of about 100 pounds per square inch, to receive gas 442 from sub-chamber 114 and gas 444 from sub-chamber 122. Likewise, a low pressure chamber 450 may be operated, in an embodiment, at a pressure of about sixty (60) pounds per square inch (psi) to receive gas 454 from intermediate chamber 440. The accumulated bleed gas in low pressure chamber 45 is recycled as indicated by arrows 456, 458, and 460 past a seal 462 and gap 464, respectfully, and returned to the converging portion 58 of the aerodynamic duct 56. Higher pressure gas 466 from intermediate chamber 440 may be returned via duct 470 and through boundary layer injection ports 472 and into converging portion 58 of aerodynamic duct 56 as indicated by arrows 474. In this way, boundary layer mass and energy losses may be eliminated, or minimized, respectively.

In FIG. 18, the supersonic nozzle/choke 23 components are provided as described elsewhere herein, but an alternate embodiment, showing use of a can type combustor 24c is illustrated, rather than the in-line trapped vortex combustor arrangement set forth elsewhere herein.

In the gas turbine engine designs disclosed herein, engine shaft efficiencies can reach 40-45% for example, in applications such as an Industrial & Marine Class Engine scale. Further, in an embodiment, the turbine specific speed may be well matched to the compressor section, to thus allow both compressor and turbine rotors to run at the same shaft rotational speed, and in an embodiment, on the same shaft, thus simplifying mechanical design and reducing cost. And, supersonic compression allows both the compressor and turbine components to operate at exceptionally high component efficiencies and pressure ratios. In an embodiment, an impulse rotor design may be utilized for both compressor and turbine(s), to minimize pressure gradients across the respective rotors and minimize thrust loads.

In the foregoing description, for purposes of explanation, numerous details have been set forth in order to provide a thorough understanding of the disclosed exemplary embodiments for the design of a novel gas turbine engine utilizing a supersonic compressor system for the efficient compression of gases. However, certain of the described details may not be required in order to provide useful embodiments, or to practice a selected or other disclosed embodiments. Further, for descriptive purposes, various relative terms may be used.

Terms that are relative only to a point of reference are not meant to be interpreted as absolute limitations, but are instead included in the foregoing description to facilitate understanding of the various aspects of the disclosed embodiments. And, various actions or activities in a method described herein may have been described as multiple discrete activities, in turn, in a manner that is most helpful in understanding the present invention. However, the order of description should not be construed as to imply that such activities are necessarily order dependent. In particular, certain operations may not necessarily need to be performed precisely in the order of presentation. And, in different embodiments of the invention, one or more activities may be performed simultaneously, or eliminated in part or in whole while other activities may be added. Also, the reader will note that the phrase "in an embodiment" or "in one embodiment" has been used repeatedly. This phrase generally does not refer to the same embodiment; however, it may. Finally, the terms "comprising", "having" and "including" should be considered synonymous, unless the context dictates otherwise.

From the foregoing, it can be understood by persons skilled in the art that a gas turbine engine has been provided for the efficient production of shaft power, which may be utilized for a variety of end uses. Although only certain specific embodiments of the present invention have been shown and described, there is no intent to limit this invention by these embodiments. Rather, the invention is to be defined by the appended claims and their equivalents when taken in combination with the description.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures. Numerous modifications and variations are possible in light of the above teachings. Therefore, the protection afforded to this invention should be limited only by the claims set forth herein, and the legal equivalents thereof.

We claim:

1. A gas turbine engine, comprising:
   (a) a casing having a longitudinal axis, said casing defining an inlet gas passageway for receiving an inlet gas, and an exhaust gas passageway for discharge of combustion gases;
   (b) an axial flow compressor rotor, comprising a compressor shaft, at least one compressor disc, and a plurality of compressor blades associated with said at least one compressor disc, said plurality of compressor blades sized and shaped to increase velocity of said inlet gas received from said inlet gas passageway from subsonic velocity to supersonic velocity;
   (c) a stator, comprising one or more aerodynamic ducts disposed about said longitudinal axis, said one or more aerodynamic ducts each comprising (1) a supersonic diffuser including a portion having a converging cross-sectional area in a flow-wise direction, for receiving said inlet gas at relative supersonic velocity and decelerating said inlet gas using one or more shock structures, (2) a subsonic diffuser including a portion having diverging cross-sectional area in a flow-wise direction, for decelerating said inlet gas to convert kinetic energy to pressure, (3) a throat located between said supersonic diffuser and said subsonic diffuser and including a portion having minimal cross-sectional area within said aerodynamic duct, (4) a fuel supply mechanism for supply of fuel, (5) a flameholder located downstream of the throat, wherein the fuel is combusted to generate the combustion gases, and (6) a choke; and
   (d) a turbine located downstream of the choke and comprising a turbine shaft, one or more turbine discs, and plurality of turbine blades associated with each of the one or more turbine discs and configured to receive the combustion gases from said one or more aerodynamic ducts and discharge the combustion gases to the exhaust gas passageway, said plurality of turbine blades configured to extract power from said combustion gases and generate shaft power.

2. A gas turbine engine as set forth in claim 1, wherein said one or more shock structures comprises at least one oblique shock.

3. A gas turbine engine as set forth in claim 1 or claim 2, further comprising providing a normal shock located at an operating position at or downstream of said throat.

4. A gas turbine engine as set forth in claim 1, wherein said plurality of compressor blades each comprise an impulse blade.

5. A gas turbine engine as set forth in claim 1 or 4, further comprising a peripheral shroud on the plurality of compressor blades.

6. A gas turbine engine as set forth in claim 1 or in claim 4, wherein said plurality of turbine blades each comprise an impulse blade.

7. A gas turbine engine as set forth in claim 6, further comprising a shroud on the plurality of turbine blades.

8. A gas turbine engine as set forth in claim 6, wherein said plurality of turbine blades comprise a single row of impulse blades.

9. A gas turbine engine as set forth in claim 6, wherein said plurality of turbine blades extract kinetic energy from said combustion gases.

10. A gas turbine engine as set forth in claim 1, wherein said compressor rotor and said turbine are coupled together.

11. A gas turbine engine as set forth in claim 10, wherein said turbine drives said compressor rotor.

12. A gas turbine engine as set forth in any one of claim 1, 8, or 10, wherein the compressor shaft and the turbine shaft turn in the same direction.

13. A gas turbine engine as set forth in claim 10, wherein loading on said plurality of compressor blades and on said plurality of turbine blades is substantially balanced, to minimize asymmetrical axial thrust load.

14. A gas turbine engine as set forth in claim 1, wherein said flameholder comprises a trapped vortex combustor.

15. A gas turbine engine as set forth in claim 14, wherein said one or more aerodynamic ducts each comprise an outward bounding wall and an inward bounding wall.

16. A gas turbine engine as set forth in claim 15, wherein said trapped vortex combustor is formed between said outward bounding wall and said inward bounding wall.

17. A gas turbine engine as set forth in claim 1, wherein said fuel comprises a liquid fuel.

18. A gas turbine engine as set forth in claim 1, wherein said fuel comprises a gaseous fuel.

19. A gas turbine engine as set forth in claim 18, wherein said fuel comprises a lean premixed fuel.

20. A gas turbine engine as set forth in claim 1, wherein said fuel supply mechanism comprises a primary fuel supply mechanism and a secondary fuel supply mechanism.

21. A gas turbine engine as set forth in claim 20, wherein said primary fuel supply mechanism comprises primary fuel injectors located in said one or more aerodynamic ducts.

22. A gas turbine engine as set forth in claim 20, wherein said secondary fuel supply mechanism comprises secondary fuel injectors.

23. A gas turbine engine as set forth in claim 22, wherein said flameholder comprises a trapped vortex combustor, and wherein said secondary fuel injectors inject fuel into a cavity defined by said trapped vortex combustor.

24. A gas turbine engine as set forth in claim 1, wherein said inlet gas comprises air.

25. A gas turbine engine as set forth in claim 1, wherein said one or more aerodynamic ducts each have a longitudinal centerline disposed at a helix angle psi ($\psi$) with respect to said longitudinal axis of said casing.

26. The gas turbine engine as set forth in claim 25, wherein said helical angle psi ($\psi$) is in the range of from about forty-five degrees (45°) to about eighty degrees (80°).

27. A gas turbine engine as set forth in claim 25 wherein orthogonal to said longitudinal centerline, said one or more aerodynamic ducts each have a generally parallelogram cross-sectional shape.

28. A gas turbine engine as set forth in claim 27, wherein associated with said cross-sectional shape, said one or more aerodynamic ducts each have an average aspect ratio, expressed as width to height, of about two to one (2:1), or more.

29. A gas turbine engine as set forth in claim 27, wherein associated with said cross-sectional shape, said one or more aerodynamic ducts each have an average aspect ratio, expressed as width to height, of about three to one (3:1), or more.

30. A gas turbine engine as set forth in claim 27, wherein associated with said cross-sectional shape, said one or more aerodynamic ducts each have an average aspect ratio, expressed as width to height, of about four to one (4:1), or more.

31. A gas turbine engine as set forth in claim 4, wherein the gas passing through the impulse blades is turned by an angle alpha ($\alpha$) of between about ninety (90) degrees and about one hundred sixty (160) degrees.

32. A gas turbine engine as set forth in claim 4, wherein the gas passing through the impulse blades is turned by an angle alpha ($\alpha$) of at least one hundred (100) degrees.

33. A gas turbine engine as set forth in claim 4, wherein the gas passing through the impulse blades is turned by an angle alpha ($\alpha$) of at least one hundred ten (110) degrees.

34. A gas turbine engine as set forth in claim 4, wherein the gas passing through the impulse blades is turned by an angle alpha ($\alpha$) of between about one hundred twelve (112) degrees and about one hundred fourteen (114) degrees.

35. A gas turbine engine as set forth in claim 4, wherein each of the plurality of impulse blades has a hub end, a tip end, and a trailing edge, and wherein supersonic gas flow is provided at the trailing edge of the impulse blades from said hub end to said tip end.

36. A gas turbine engine as set forth in claim 1, further comprising a contraction ratio adjuster having a startup configuration wherein the contraction ratio of at least one of the one or more aerodynamic ducts is decreased, so as to allow inlet gas to bypass the throat, and an operating configuration, wherein inlet gas bypass of the throat is effectively eliminated.

37. A gas turbine engine as set forth in claim 36, wherein said contraction ratio adjuster comprises a bypass outlet door, wherein the bypass outlet door is moveable between a startup configuration wherein the bypass outlet door is in an open position, wherein throat $O_2$ having area $A_2$ is provided for passage of inlet gas past said throat, and an operating configuration, wherein said bypass outlet door is in a closed, operating configuration, wherein throat $O_1$ having area $A_1$ is provided, and wherein $A_2$ is of greater area than A1.

38. A gas turbine engine as set forth in claim 37, wherein said contraction ratio adjuster further comprises a pressurizable plenum configured to confine inlet gas from at least one of the one or more aerodynamic ducts and allow return of said inlet gas to said at least one of said plurality of aerodynamic ducts downstream of said throat.

39. A gas turbine engine as set forth in claim 1, further comprising a startup system including bypass gas passageways for collection of a portion of inlet gas, a sub-chamber adjacent the supersonic diffuser portion for receiving collected inlet gas, and an outlet valve from said sub-chamber for discharge, during starting, of said collected inlet gas, the startup system configured to adjust effective contraction ratio for startup.

40. A gas turbine engine as set forth in claim 1, wherein the supersonic diffuser, or subsonic diffuser, or both, further comprises bleed ports, for boundary layer removal.

41. The gas turbine engine as set forth in claim 1 or 14, wherein said one or more aerodynamic ducts comprises a plurality of aerodynamic ducts, and wherein said plurality of aerodynamic ducts are arranged in adjacent fashion.

42. The gas turbine engine as set forth in claim 41, further comprising partition walls between adjacent aerodynamic ducts.

43. The gas turbine engine as set forth in claim 42, further comprising cooling passages within said partition walls.

44. A gas turbine engine as set forth in claim 5, wherein overall pressure ratio is greater than about seven to one (7:1).

45. A gas turbine engine as set forth in claim 5, wherein overall pressure ratio is in the range of from about ten to one (10:1) to about twenty to one (20:1).

46. A gas turbine engine as set forth in claim 5, wherein overall pressure ratio is greater than about fifteen to one (15:1).

47. A gas turbine engine as set forth in claim 5, wherein overall pressure ratio is greater than about twenty to one (20:1).

48. A gas turbine engine as set forth in claim 5, wherein overall pressure ratio is about fifteen to one (15:1) or more, and wherein thermal efficiency is about thirty five percent (35%) or more.

49. A gas turbine engine as set forth in claim 5, wherein overall pressure ratio is about twenty to one (20:1) or more, and wherein thermal efficiency is about forty five percent (45%) or more.

50. A gas turbine engine as set forth in claim 5, wherein overall pressure ratio is in the range of from about fifteen to one (15:1) to about twenty to one (20:1).

51. A gas turbine engine as set forth in claim 5, wherein overall pressure ratio is in the range of from about twenty to one (20:1) to about thirty to one (30:1).

52. A gas turbine engine as set forth in claim 5, wherein overall pressure ratio is in the range of from about thirty to one (30:1) to about forty to one (40:1).

53. A gas turbine engine as set forth in claim 50 wherein thermal efficiency is about forty two percent (42%) or more.

54. A gas turbine engine as set forth in claim 51 wherein thermal efficiency is about forty two percent (42%) or more.

55. A gas turbine engine as set forth in claim 52 wherein thermal efficiency is about forty two percent (42%) or more.

56. A gas turbine engine, comprising:
(a) a casing having a longitudinal axis, said casing defining an inlet gas passageway for receiving an inlet gas, and an exhaust gas passageway for discharge of combustion gases;
(b) a compact compressor-combustor comprising
   (1) an axial flow compressor rotor comprising a compressor shaft, at least one compressor disc, and a plurality of impulse blades associated with said at least one compressor disc, said plurality of impulse blades having a peripheral shroud and being sized and shaped to increase velocity of said inlet gas received from said inlet gas passageway from a relative subsonic velocity to a relative supersonic velocity; and
   (2) a stator comprising a plurality of aerodynamic ducts disposed about said longitudinal axis, and each comprising (A) a supersonic diffuser including a portion having a converging cross-sectional area in a flow-wise direction, for receiving said inlet gas at relative supersonic velocity and decelerating the inlet gas using one or more shock structures, (B) a subsonic diffuser including a portion having diverging cross-sectional area in a flow-wise direction, for decelerating said inlet gas to convert kinetic energy to pressure, (C) a throat located between said supersonic diffuser and said subsonic diffuser and including a portion having minimal cross-sectional area within said aerodynamic duct, (D) a fuel supply mechanism for supply of fuel, (E) a flameholder located downstream of the throat, wherein the fuel is combusted to generate the combustion gases, and (F) a choke;
(c) a turbine located downstream of the choke and comprising a turbine shaft, at least one turbine disc, and plurality of turbine impulse blades associated with each of said at least one turbine disc, said plurality of turbine impulse blades having a peripheral shroud, the turbine configured to receive the combustion gases from said aerodynamic ducts and discharge the combustion gases to the exhaust gas passageway, said plurality of turbine blades configured to extract power from said combustion gases and generate shaft power.

* * * * *